(12) United States Patent
Liu et al.

(10) Patent No.: US 8,447,875 B2
(45) Date of Patent: May 21, 2013

(54) UNIFIED CACHE AND PEER-TO-PEER METHOD AND APPARATUS FOR STREAMING MEDIA IN WIRELESS MESH NETWORKS

(75) Inventors: Hang Liu, Yardley, PA (US); Yang Guo, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 406 days.

(21) Appl. No.: 12/721,257

(22) Filed: Mar. 10, 2010

(65) Prior Publication Data

US 2011/0225311 A1 Sep. 15, 2011

(51) Int. Cl.
G06F 15/16 (2006.01)

(52) U.S. Cl.
USPC ........... 709/231; 709/232; 709/219; 709/217; 370/312; 370/328; 370/338; 370/400; 725/32; 725/109

(58) Field of Classification Search
USPC .................................. 709/231, 232, 219, 217
See application file for complete search history.

(56) References Cited

U.S. PATENT DOCUMENTS

| | | | |
|---|---|---|---|
| 7,653,689 B1 * | 1/2010 | Champagne et al. ......... | 709/206 |
| 7,752,327 B2 | 7/2010 | Li | |
| 7,818,402 B1 | 10/2010 | Zhang | |
| 8,078,729 B2 | 12/2011 | Kozat et al. | |
| 8,166,148 B2 | 4/2012 | Kisel et al. | |
| 8,310,999 B2 * | 11/2012 | Seok et al. ................... | 370/329 |
| 2003/0202476 A1 | 10/2003 | Billhartz et al. | |
| 2006/0146712 A1 * | 7/2006 | Conner et al. ................ | 370/235 |
| 2009/0177792 A1 | 7/2009 | Guo et al. | |

(Continued)

FOREIGN PATENT DOCUMENTS

| | | |
|---|---|---|
| WO | 2006099025 A1 | 9/2006 |
| WO | WO2008002295 | 1/2008 |
| WO | 2009029071 A2 | 3/2009 |

OTHER PUBLICATIONS

Abstract: Yingnan Zhu et al., "Challenges and Opportunities in Supporting Video Streaming Over Infrastructure Wireless Mesh Networks", Proceedings 2009 IEEE International Conference on Multimedia and Expo (ICME), Dept. of Comput. Sci, Univ. of Missouri, Columbia, MO, IEEE 2009.

Abstract: Yingnan Zhu et al., "Supporting Video Streaming Services in Infrastructure Wireless Mesh Networks: Architecture and Protocols," 2008 International Conference on Communications; Dept. of Comput. Sci, Univ. of Missouri, Columbia, MO, IEEE 2008.

*Primary Examiner* — Jude Jean Gilles
(74) *Attorney, Agent, or Firm* — Robert D. Shedd; Jeffrey M. Navon; Catherine A. Cooper

(57) ABSTRACT

A method and apparatus are described including receiving a route request message to establish a streaming route, determining a cost of a reverse route and traffic load introduced by the requested streaming route, discarding the route request message if one of wireless interference constraints for the requested streaming route cannot be satisfied and quality of service requirements for the requested streaming route cannot be satisfied, pre-admitting the route request message if wireless interference constraints for the requested streaming route can be satisfied and if quality of service requirements for the requested streaming route can be satisfied, adding a routing table entry responsive to the pre-admission, admitting the requested streaming route, updating the routing table and transmitting a route reply message to an originator if requested content is cached, updating the route request message and forwarding the updated route request message if the requested content is not cached, receiving a route reply message and deleting the pre-admitted routing table entry if a time has expired.

8 Claims, 14 Drawing Sheets

U.S. PATENT DOCUMENTS

| | | | |
|---|---|---|---|
| 2010/0083303 A1* | 4/2010 | Redei et al. | 725/32 |
| 2010/0094972 A1 | 4/2010 | Zuckerman et al. | |
| 2010/0177750 A1* | 7/2010 | Essinger et al. | 370/338 |
| 2010/0185753 A1* | 7/2010 | Liu et al. | 709/219 |
| 2011/0225311 A1* | 9/2011 | Liu et al. | 709/231 |

* cited by examiner

UNIFIED CACHE AND PEER-TO-PEER METHOD AND APPARATUS FOR STREAMING MEDIA IN WIRELESS MESH NETWORKS

FIELD OF THE INVENTION

The present invention relates generally to wireless mesh networks and, in particular, to optimizing cache, routing and admission control in a cross-layer strategy for streaming media.

BACKGROUND OF THE INVENTION

In multicast/broadcast applications, data are transmitted from a server to multiple receivers over wired and/or wireless networks. A multicast system as used herein is a system in which a server transmits the same data to multiple receivers simultaneously, where the receivers form a subset of all the receivers up to and including all of the receivers. A broadcast system is a system in which a server transmits the same data to all of the receivers simultaneously. That is, a multicast system by definition can include a broadcast system.

Mobile devices include but are not limited to computers, laptops, notebook computers, personal digital assistants (PDAs), dual mode smart phones, user devices, clients, client devices, mobile terminals and any other devices that can receive streaming data via wireless networks. Streaming data includes but is not limited to audio, video, and multimedia data.

Various routing protocols and routing metrics have been well researched for best-effort data transmission. The majority of the work regarding supporting delay-sensitive streaming applications in WMNs has been based on traditional server-client architecture. Multi-path delivery with scalable video coding or multiple description coding from a single server to the receiver has been investigated to improve the robustness of video transmission over WMNs. Cross-layer adaptation schemes have also been explored to improve the transport efficiency by providing different priorities and unequal protection to scalable video traffic in IEEE 802.11e-enabled wireless mesh networks. The above schemes cannot ensure the QoS of video streaming since there is no admission control and the traffic load could exceed the network capacity. In one prior art study, an interference-aware admission control and a QoS routing scheme for WMNs was proposed. However the prior art scheme only considers a flow from a known server to a client. Client-server methods suffer from scalability problems and few of them can achieve good video streaming performance with a reasonable number of users in a certain size of WMNs. Existing admission control and routing schemes for single server cannot be directly applied to the multiple cache model.

P2P applications were first introduced for file sharing. Applications such as BitTorrent and KaZaa have attracted a large number of users and contribute to a large amount of network traffic over the Internet. Recently, P2P techniques have also been adopted to support video streaming service. Most of the P2P streaming research was done in a wired network setting and did not consider the impact of unique characteristics in wireless mesh networks. In another prior art study, peer-to-peer streaming in a WMN environment was studied and a central server was used to find the best route for each client to other peers that minimized the received video distortion. This approach required that the central server had the knowledge of the complete network connection status, which is difficult in dynamic wireless environments. In another prior art study, the collaboration among peers was studied, and the network resource information exchanges were enabled for the scalable coding of the video content and cross-layer optimization which allowed efficient adaptation to varying channel conditions and available resources. However, this approach incurred a great deal of control information overhead and dynamic path update was not considered. Moreover, pure P2P streaming experiences a long startup delay and churn-induced instability without QoS guarantee.

Caching on the wired Internet and wireless networks has been studied and it has been observed that caching can improve network performance by saving bandwidth, reducing delays to clients, and balancing the traffic load at the server and on the underlying network. The cache placement and replacement schemes have been investigated for the Internet, for Mobile Ad Hoc Network (MANet), and more recently for Wireless Mesh Networks (WMNs). Caches are typically placed at the edge of the networks in the form of browser and proxy caches, at the ends of high latency links, as part of cache hierarchies, or inside the network. These existing works focus on the cache placement and replacement, and assume the cache for retrieving content was selected by a centralized redirection scheme or by intercepting the request message along the route to the original server. In addition, they did not consider that user devices could play an important role in improving the content availability throughout the network by contributing more dynamic storage, and the cache router could function as a distributed tracker to help improve the P2P architecture. That is, the intrinsic interaction between peers and cache routers to improve the overall performance of the network throughput has not been exploited.

SUMMARY OF THE INVENTION

Delivery of high-quality streaming services such as video-on-demand over multi-hop wireless mesh networks (WMNs) is a challenging problem due to the inter-flow and intra-flow interference, the quality fluctuation of wireless links, as well as the strict delay, throughput and reliability requirements for streaming applications. Usually, the capacity of WMNs is restricted by the multi-hop throughput of IEEE 802.11 wireless networks. Increasing the content availability and maintaining a high throughput path for the data flows are important for streaming applications in WMNs.

Multi-hop wireless mesh networks (WMNs) are emerging as a promising technology to extend wireless coverage for Internet access, public safety, and etc due to its advantages such as flexible and cost-effective deployment, no cable, and automatic network organizing and self-healing. Industry standards are being developed in the IEEE 802.11s for WiFi-based mesh networks and IEEE 802.15.5 for wireless Personal Area Network (PAN) mesh. Next-generation WiMax networks based on IEEE 802.16m will support multi-hop relay. The Third Generation Partnership Project's Long Term Evolution-Advanced (3GPP LTE-advanced) is also considering multi-hop relay architecture for next-generation cellular networks.

Meanwhile multimedia streaming and content distribution are popular applications with a broad base of users. Web and P2P (mainly for content sharing) have been the top two applications in generating Internet traffic over the past several years. The traffic volume of multimedia streaming such as video-on-demand continues to increase. With the growing deployment of WMNs and the increasing number of WMN users, supporting multimedia streaming over wireless mesh networks becomes more and more important.

To date, most of the research in WMNs has been focused on providing best-effort service for last-mile Internet access. Support for streaming services in WMNs has not been well explored. Practical work on the design of algorithms and protocols for multimedia streaming over WMNs is still at a preliminary stage. How to provide multimedia streaming services with good quality of service (QoS) over WMNs scalably and efficiently due to intensive throughput, strict delay and reliability requirements for streaming applications as well as limited available bandwidth, quality fluctuation of wireless links, intra-flow and inter-flow interferences is a challenging problem. The interference between neighboring nodes greatly reduces the throughput of multi-hop path while the hop count increases.

Traditional streaming service such as video-on-demand is client-server based. However the client-server approach does not scale well, leading to traffic congestion around the server (or the gateway if the server is in the wired Internet). Because of the low throughput of multi-hop path and traffic load locality around server or gateway, the intuitive way to improve the performance is to distribute the heavy traffic load throughout the network and bring the content source closer to the users to reduce the number of relay transmissions during data delivery. Peer-to-Peer video streaming has recently emerged as an alternative with good scalability and low infrastructure cost. For video streaming over Internet, the bottleneck is generally the access bandwidth at the edge, either at the server or at the client. The participating users (peers) form an overlay network and contribute resources (upload bandwidth, storage space, processing power, etc.); the amount of available resources in a peer-to-peer system grows with the number of users (peers). Although, in WMNs, the participating peers may not increase the available bandwidth of a P2P system due to the shared wireless medium, the peers can contribute the storage and upload the content the peers have to other peers. A peer may get the cached content from another peer closer to it rather than the original source, which may be far away so the bandwidth is saved. However, pure P2P streaming systems experience problems of a long startup delay and churn-induced instability that can greatly degrade the user experience. Furthermore, the number of peers that share the same content within a WMN may be small due to limited network geographic size and peer population. If each peer in the WMN shares different content with other peers in the wired Internet, it will cause a heavy traffic load around the gateway. It is difficult to guarantee the QoS with traditional P2P streaming techniques for a reasonable number of video flows in the current WMNs.

In recent years, there have been dramatic advances in the technology areas of microprocessor and data storage. Modern wireless routers are equipped with much more powerful processing capability and larger storage capacity at significantly lower prices than even a couple of years ago. This trend is continuing. Therefore, tradeoffs between processing power and storage capacity requirements and bandwidth efficiency can be balanced in the protocol design. Caching has been used in content distribution networks (CDNs), where overlay cache servers are strategically deployed at the edge of the Internet, to reduce the traffic within the network and shorten the users' startup delay.

Herein, a Unified Peer-to-Peer and Cache (UNICAP) framework to support high quality multimedia streaming services such as video-on-demand in WMNs is described. UNICAP exploits the ever increasing storage capacity in modern wireless routers to cache the content in the network for increasing service capacity and ensuring high quality delivery. A streaming session is established between a mobile device and its optimal mesh cache router. In addition mobile devices help each other on content downloading in a best effort manner to further reduce the workload imposed on the mesh networks by constructing a cooperative peer-to-peer (P2P) overlay with the mesh cache routers. A theoretical formulation is provided for optimization of mesh cache router selection and routing. Practical distribution algorithms are then developed to establish the delivery path with admission control. The performance improvement brought by the P2P overlay is also investigated.

A method and apparatus are described including determining a number of clips to be streamed, requesting a selection of a mesh cache server to meet quality of service requirements for streaming the determined number of clips, establishing a streaming route responsive to the mesh cache server selection, receiving the number of streamed clips from the selected mesh cache server if the request is granted, joining a peer-to-peer network, downloading a next clip via the peer-to-peer network, requesting a selection of a mesh cache server to meet quality of service requirements for complimentary streaming any data missing from the next clip, receiving any data missing from the next clip via complimentary streaming if the request for complimentary streaming is granted and continuing to download any missing data of the next clip that has at least one of not passed its playback deadline and not been requested via complimentary streaming.

A method and apparatus are also described including receiving a route request message to establish a streaming route, determining a cost of a reverse route and traffic load introduced by the requested streaming route, discarding the route request message if one of wireless interference constraints for the requested streaming route cannot be satisfied and quality of service requirements for the requested streaming route cannot be satisfied, pre-admitting the route request message if wireless interference constraints for the requested streaming route can be satisfied and if quality of service requirements for the requested streaming route can be satisfied, adding a routing table entry responsive to the pre-admission, admitting the requested streaming route, updating the routing table and transmitting a route reply message to an originator if requested content is cached, updating the route request message and forwarding the updated route request message if the requested content is not cached, receiving a route reply message and deleting the pre-admitted routing table entry if a time has expired. A method and apparatus are also described including receiving a request to select a mesh cache server and to establish a streaming route, determining if there is enough bandwidth to serve the request and quality of service requirements specified in the request can be met, broadcasting an enhanced route request message to locate the mesh cache server responsive to the determination, receiving at least one route reply message, selecting the mesh cache server and the streaming route responsive to the reply message, establishing the streaming route, transmitting a route confirmation message to the selected mesh cache server along the streaming route, transmitting a request granted message to originator of the request and transmitting a rejection responsive to the determination.

A method and apparatus are also described including collecting link characteristics and channel conditions in a wireless mesh network, receiving a request to select a mesh cache server to meet quality of service requirements for streaming a number of clips, determining the mesh cache server and a streaming path, transmitting a message to originator of the request including the selected mesh cache server and any intermediate mesh routers if the determination is feasible, establishing the streaming route responsive to the request responsive to the transmission, streaming the requested number of clips responsive to the establishment, rejecting the request if the determination is not feasible.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

Figure 1A:
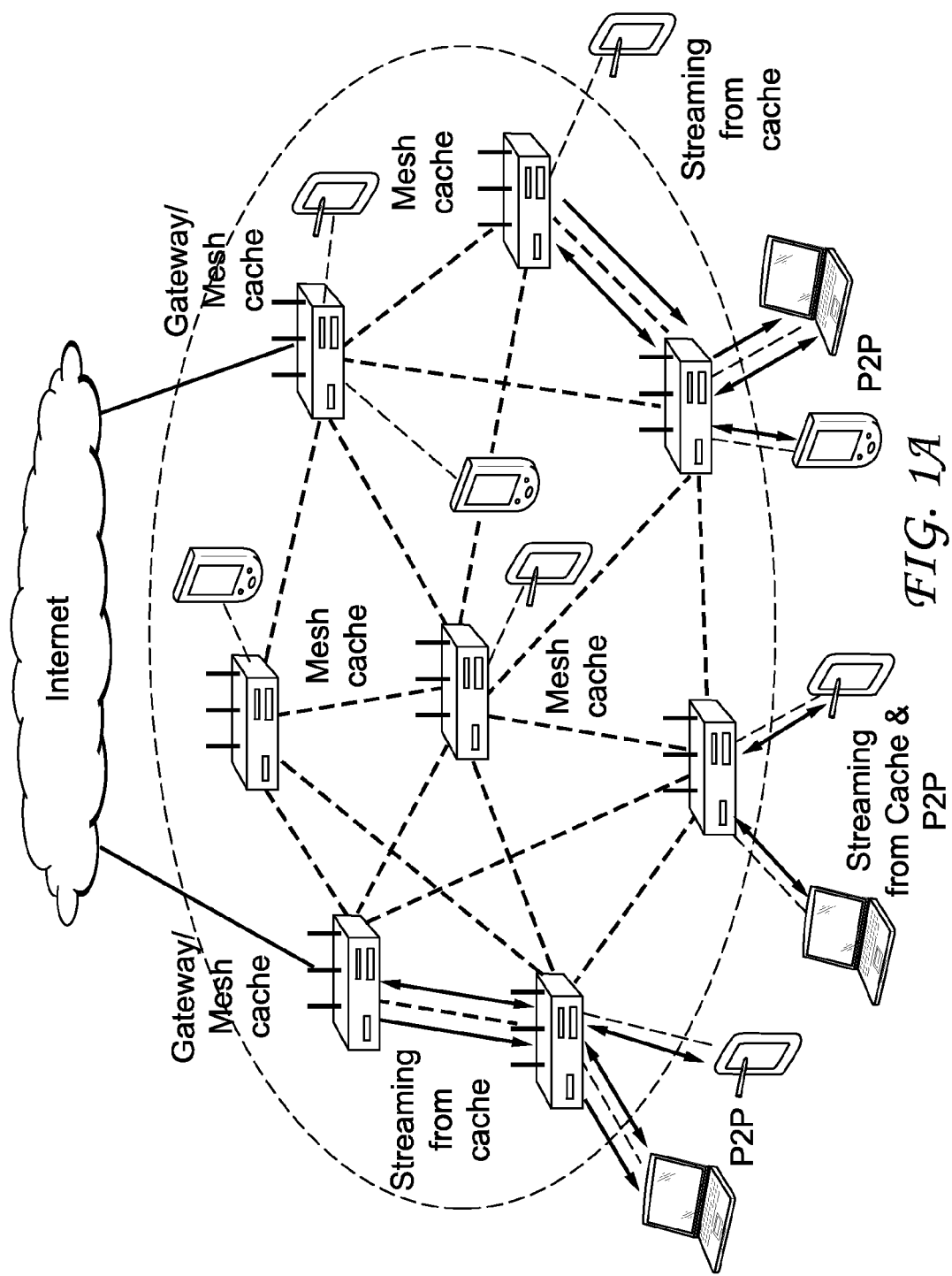
FIG. 1A is a schematic diagram of a wireless mesh network infrastructure.

UNICAP differs significantly from existing Internet CDN schemes. In UNICAP, a client device can concurrently form a P2P relationship with mesh cache routers and other peer devices for best-effort downloading. It can also establish a client-server relationship with a mesh cache router for streaming. The mesh cache routers support both content streaming and P2P data downloading. It is important to note that the scheduling scheme for content streaming and P2P content fetching is different. Content streaming requires in-order on-time delivery. P2P content fetching may use a different dissemination policy among the peers. Furthermore, the network environment is different. In the Internet, the bottleneck is either at the server or at the client. In wireless mesh networks, the bottleneck may be within the network. Due to shared nature of the wireless medium, one content flow may interfere with another flow even if the two flows are from different mesh cache routers and do not pass through the same intermediate relay node(s). The cache selection, routing and admission control scheme to optimize the QoS of a video session in a WMN needs to take this impact into account through the cross-layer strategy.

It is believed that performance can be greatly improved by exploiting increasing storage capacity of wireless routers in protocol design. Herein, a unified cache and P2P (UNICAP) framework for multimedia streaming services such as video-on-demand over infrastructure wireless mesh networks is described. UNICAP integrates distributed network caching capability into wireless mesh routers. To increase the capacity of the streaming services and ensure high delivery quality, some or all wireless mesh routers have capability to cache the content in the mesh network and are called mesh cache routers herein. In addition, cache at a user device is treated as extended but more dynamic cache of its associated mesh cache router. User devices help each other on content downloading in a best effort manner to further balance the network traffic load and reduce the network resource consumption. A device can form a P2P relationship with mesh cache routers and other user devices for data downloading. Meanwhile, it can form a client-server relationship with a mesh cache router for streaming. Downloading and streaming uses different transport strategies. Downloading is best-effort and retrieves the content as fast as possible and may arrive in any order and have to be re-ordered by the recipient. Streaming provides in-order and on-time delivery in high priority with admission control to ensure the QoS. Streaming occurs when the downloading cannot meet the delay requirements.

Unlike in the Internet where the bottleneck is typically the access bandwidth at the server or at the client, the bottleneck may be within the network in WMNs. By in-network caching with the mesh cache routers, the path to deliver the content can be shortened, interference within the wireless network can be reduced, and the delay and throughput performance can be improved. Compared with the overlay CDN approach, distributed in-network caching with mesh cache routers in UNICAP allows consideration of the underlying wireless environments and facilitates efficient cross-layer design. Compared to P2P systems formed by user devices, mesh cache routers are much more stable and are more powerful infrastructure nodes than normal client devices in an infrastructure WMN. Mesh cache routers are also generally fixed or have low mobility. With caching in the mesh cache router, churn and delay problems that occur in P2P streaming can be greatly reduced. It is believed that UNICAP is the first framework that integrates in-network caching and P2P networking with the optimization of link layer transmission and network layer routing.

By leveraging the unique architecture of UNICAP, the effectiveness and challenging issues in applying unified mesh cache router and P2P networking approach to achieve performance optimization and efficient resource management for multimedia streaming applications in wireless mesh networks can be investigated. The focus is on how to select the mesh cache router for streaming to a user device and how to ensure the high-quality of streaming session using cross-layer optimization approaches. Distributed approaches for P2P network construction are also studied and the impact of the distributed approach on the system performance is examined.

Described herein, therefore, is a unified cache and P2P (UNICAP) architecture to support high quality multimedia streaming services such as video-on-demand in WMNs. The UNICAP architecture allows the full exploitation of the advantages of both cache and P2P systems to optimize the streaming video performance. A theoretical formulation of the optimization problem for mesh cache router selection and routing with admission control using cross-layer approaches with QoS guarantee is provided. The theoretical analysis quantifies the potential performance gain brought by exploiting in-network caching and provides interesting insights to design practical mesh cache router selection and routing algorithms. Practical distributed sub-optimal algorithms to select cache and establish the delivery path with admission control are then developed. The approaches for P2P network construction are investigated and the impact on the system performance of the network construction is examined.

FIG. 1A shows a wireless mesh network infrastructure. Mesh routers or mesh access points (MAPs) constitute a multi-hop wireless infrastructure. One or more mesh routers and/or MAPs are connected to the wired Internet acting as the mesh gateway. Client devices without mesh functions such as laptops, smart phones, etc., do not participate in the packet relay and routing process, but associate with a mesh router to obtain network access. The mesh routers forward traffic for the client devices in the mesh. A mesh router supports two types of wireless network interfaces. The access interface provides network access for client devices, while the relay interface is used to construct the wireless multi-hop backhaul. The two interfaces work on non-overlapped channels to avoid interference with each other.

It is assumed herein that IEEE 802.11 radios are used to construct the wireless mesh network and the media access control (MAC) layer is IEEE 802.11e Enhanced Distributed Channel Access (EDCA). To provide QoS in IEEE 802.11 networks, EDCA enables distributed prioritized access to the shared wireless channel with the support of multiple access categories (AC). Different classes of packets are mapped to different ACs. Each AC has its own transmission queue and different MAC parameters that are used by a node to access the channel in order to transmit packets with certain priorities. With EDCA, high priority traffic has a higher chance of being sent than low priority traffic. As used herein traffic includes data, which may be audio, video or multimedia and may be in packets or frames, which are formatted data, or any other convenient format. A station with high priority traffic waits less time before it sends its packet than a station with low priority traffic. It reduces the impact of network-related transient issues such as changes in available bandwidth to the high priority data. It also protects the high priority flow (traffic) from interference by low priority data and ensures that the high priority traffic has sufficient resources even if the total transmission demands exceed network capacity. Furthermore IEEE 802.11e defines the procedures and control signaling messages to support admission control for high-priority ACs.

Note that although IEEE 802.11 based mesh networks are used for explanatory purposes due to their popularity, the UNICAP framework can also be used for other types of mesh networks, for example, IEEE 802.16 based mesh networks. IEEE 802.16 also defines various traffic classes. Its TDMA MAC can guarantee the bandwidth for certain high-priority traffic classes with admission control.

UNICAP supports file-based streaming services such as video-on-demand in which clients can request content files to be played back in real time whenever they want. It envisions a wireless mesh network in which selected (potentially all) mesh routers have caching capability. UNICAP incorporates streaming from multiple mesh cache servers and content downloading using a P2P network so as to achieve a high quality of user experience with little content playback wait time and increased system scalability. A user can form a P2P network with mesh cache servers and other peer users to download content. Meanwhile, it establishes a client-server relationship with a mesh cache server for streaming content to it. The mesh cache servers of the present invention play two roles, streaming servers to stream the content to the requesting clients and content sharing peers in the P2P network. It is important to note that the streaming and P2P downloading in the UNICAP are different. Streaming provides in order and on-time data delivery from the mesh cache server to the requesting client. For P2P downloading, data are exchanged out of the original order among peers using a different dissemination policy. The mesh cache server supports the scheduling schemes for both streaming and downloading.

Furthermore the streaming traffic will be assigned high priority with QoS routing that selects a mesh cache server and establishes a streaming path to ensure its QoS. The P2P downloading traffic is transmitted best effort with traditional minimum cost routing and a low priority AC. Note that when any reserved bandwidth is not used by the streaming traffic, the available bandwidth can be used by the best-effort traffic. UNICAP uses different packet priority schemes to ensure that streaming data gets delayed as little as possible, while utilizing the remaining bandwidth efficiently to transmit best-effort P2P packets.

In UNICAP, it is assumed that there is a main content server which is the source of the original content. The main content server may reside outside or inside the WMN. It is assumed that the content may be cached in the mesh cache routers located within the WMN through mechanisms such as off-peak hour delivery or enroute caching as the router is involved in relaying the content. Herein the focus is on the content retrieval problem, assuming the content is uniformly cached in the WMN, so that a client device can reach a nearby cache location within a few hops. In this way the content delivery path is shortened so the interference and delay are reduced.

A large content file can be divided into multiple equal-size segments, denoted as clips. For example, each clip can be several minutes of video content. A client obtains the clips in their original (proper) order. Different mesh cache routers may cache different content. When a client requests streaming (initial streaming or complementary streaming), it selects the mesh cache server and establishes the streaming path either in a centralized scheme or in a distributed manner to meet its QoS requirement. If a streaming path that satisfies its QoS requirement cannot be found, the client can still join the P2P network to download the content in a best effort manner, but the quality of service is degraded. Mesh cache router selection and QoS path establishment is developed to optimize the content delivery using cross-layer approach later.

A P2P network includes mesh cache servers and clients for downloading content. Users of VoD-like services watch different portions of content at any given moment. It is assumed that each client also has the storage capacity to cache a partial copy or the entire copy of content that has been played. Clients that have the desired content, if available in the mesh, also serve as uploading peers to further improve the system performance.

The user at a mobile device joins a P2P network to download the content. Different P2P data downloading or fetching schemes can be integrated into UNICAP. Herein, a P2P scheme similar to BitTorrent is considered. In order for a new peer to join the P2P network, a tracker module is used to help the peers find each other and keep the content download and upload statistics of each peer. The P2P tracker module can be hosted on the mesh gateway, a mesh router, the original content server, or can be an entirely separate server. The P2P tracker module provides the P2P network directory service for the client devices. The address of the P2P tracker for the content or content clip is known in advance by the client devices through configuration or other means. Each peer periodically updates their status with the P2P tracker so that the P2P tracker maintains the up-to-date information for the peers' content downloading in the P2P network. It should be noted that a mesh cache router can also execute the P2P protocol and serves as a peer. Once its P2P fetching for a content clip is activated, a client device obtains the information about its peer set and the content file such as the number of clips and the number of sub-clips in each clip from the P2P tracker. The client device then establishes peer relationships with the set of peers and becomes a member of the P2P network to download and upload the content with the peers in the P2P network. In the P2P data fetching of a clip, the clip is further divided into smaller chunks or pieces or sub-clips. These small chunks (pieces, sub-clips) are exchanged (fetched or provided) among the peers. Within a clip, one example policy is that the rarest data chunks are first fetched from the peers. Other policies for P2P data fetching can also be used. It should be noted that a mesh cache server also run the P2P protocol and serves as a peer.

A P2P network is formed for each content file download. Alternatively, a P2P network can be formed for downloading each content clip. To construct more efficient P2P network, UNICAP leverages the underlying mesh network's structure. First, the P2P tracker can have the network topology information and select a set of peers closer to the requesting peer during initialization. Second when a peer retrieves a piece of data (piece of a clip), it prefers a peer with the better path. Note that the client is only associated with a mesh router and does not participate in routing within the infrastructure WMN. The client sends the peer request packet to its peers via its associated mesh router at P2P connection establishment. When the mesh router receives a peer request packet, or any packet from its client, the mesh router discovers, establishes, and maintains the best route to the destination on behalf of the client based on the destination address in the packet. To facilitate the cross-layer design to improve P2P data fetching performance, UNICAP implements a proxy at each mesh router. The mesh router can inform the associated client of the path cost to each of its peers and whether the peer is associated with the same mesh router. When a client fetches data from its peers, the client prefers the peers associated with the same mesh router or with better path metric (cost).

Because of the out-of-order data exchanges, churn and dynamics in the P2P downloading, the P2P startup delay is different for clips of the same content and there is no guarantee that the client device can get the content in time from other peers. In order to ensure that the requested data is available on time and the startup delay is minimized. A client device can request the first N content clips (N≧1) streamed in order from the mesh cache routers that it selected or the original content server. Meanwhile, the client device requests and fetches other clips of content (i>N) from other peers in the P2P network and tries to use peer resources as much as possible while receiving the streaming data of the first N clips from its mesh cache router.

The data of a clip has to be fetched before its playback time. However, there is no guarantee that the user can get the content in time from other peers because of churn and dynamics in the P2P downloading. The P2P fetching deadline of a clip is defined as the playback start time of the clip minus a time delay D. D is a parameter related to the network transmission and processing delay. It is desirable that a user can completely fetch a clip of content from peers before its P2P fetching deadline. If the pieces in a clip are not fetched completely from the peers by its fetching deadline, a user will request to establish a complementary streaming session with a mesh cache server, and request the missing data pieces that are not expected to finish downloading before their playback time to be streamed from the mesh cache server directly. The complementary streaming has high transmission priority and provides content data in its original order with less latency, which helps the user to get the data in time. In the meantime, the user starts P2P downloading of next clip.

In general, a mesh cache server has three main tasks. First, it is responsible for streaming the first N clips of the requested content to the requesting user for reducing the playback startup delay. Second, the mesh cache server provides complementary streaming of missing pieces in a clip for their on-time delivery. Third, it serves as a P2P seed for content downloading.

BitTorrent employs two key components in its design, peers select a piece to download in a rarest first manner for efficient data dissemination, and they exchange pieces with each other in a tit-for-tat policy to encourage collaboration. To support time sensitive data, UNICAP partitions the content file into clips. The clip closest to its playback time is given the highest priority to download and the rarest-first piece selection mechanism happens within a clip. This is similar to the scheme in that gives the data close to its playback time a higher downloading priority. Moreover, UNICAP employs network-aware peer selection to exchange data instead of tit-for-tat. It assumes that peer collaboration can be encouraged through other means, e.g. giving contributors the higher priority to access the network for other services. Tit-for-tat has been shown unsuitable for VoD-like services since the users that arrived earlier have content for the latecomers but latecomers have little content to offer. Network-aware peer selection can balance the network traffic load and improve the amount of data that can be downloaded before deadline.

In UNICAP, users try to retrieve the content through best-effort P2P downloading as much as possible, while urgent data is streamed in high priority. Streaming is performed from the stable infrastructure mesh cache servers to reduce the churn and ensure the QoS. In the P2P downloading, dynamic users also contribute by uploading the content pieces they have to other peers, thereby balancing the traffic load further and saving the bandwidth.

A theoretical framework for optimization of mesh cache selection and routing with admission control for user's streaming request is formulated. The benefits of in-network caching and cross-layer design are characterized by considering the underlying interference limitations in wireless mesh networks. The mesh cache server and the path used to stream the content (data) to each requesting client are selected with an objective of minimization of overall network resource usage in the presence of wireless interference and subject to QoS constraints for video streaming. The number of served streaming sessions is then maximized in the network.

The wireless mesh network can be modeled by a directed graph $G(V,E)$, where V is the set of vertices, representing the wireless nodes (peers, users) within the network, $V=\{v_i|i=1, 2, \ldots N\}$ which includes mesh routers/MAPs and mesh clients or stations (STAs). Each node $u \in V_m$ represents a mesh router, each node $u \in V_c$ is a user device (client device, client station (STA)), and $V=V_m \cup V_c$. Some mesh routers are mesh cache routers (servers) with caching capability, and a node $u \in V_s$ represents a mesh cache server. The mesh cache servers are a subset of the mesh routers ($V_s \subseteq V_m$). In addition, among the mesh routers in $V_m$ some of them $u \in V_g$ ($V_g \subseteq V_m$) are mesh gateways that provide connectivity to the wired Internet. A link $e_{uv}=(u,v) \in E$ denotes that direct communication is possible from node u to v.

Consider that each mesh router is equipped with two radio interfaces, one radio interface is the relay interface for the mesh router-mesh router backhaul connection and the other radio interface is the access interface for the clients associating with this mesh router. The two radios operate on orthogonal channels. A client is equipped with one radio for access, whose operating channel is determined by the associated mesh router. A mesh router (its access radio) together with its associated clients is called a Basic Service Set (BSS). It is assumed that a common channel is used for all backhaul communications. To avoid inter-cell interference for access links, channels are carefully assigned to the BSSs and the neighboring mesh routers use orthogonal channels for their access interface to communicate with their associated clients (STAs). Then, there are two kinds of interference within the network, the interference among mesh routers in the backhaul and the interference among clients associated with the same mesh router for access in a BSS.

Consider that the radio in each node has transmission range $D_T$ and interference range $D_I$, where $D_I = q \times D_T$ with $q \geq 1$. In the IEEE 802.11 setting, the interfering range $D_I$ is typically from one to two times $D_T$. A communication link exists between two nodes if they are within the transmission range and use the same channel. $d(u, v)$ denotes the distance between two nodes u and v. In the mesh backhaul, there exists a backhaul link $e_{uv}=(u,v) \in E_b$ between two mesh routers $u,v \in V_m$ if $d(u,v) \leq D_T$, representing that mesh router u can communicate with mesh router v directly (in one hop). In a BSS, there exists an access link $e_{uv}=(u,v) \in E_a$ between a mesh router $u \in V_m$ and its associated client (STA) $v \in v_c$ if $d(u,v) \leq D_T$, representing that the mesh router $u \in v_m$ and the client $v \in v_c$ can communicate directly (in one hop). The total link set $E=E_a \cup E_b$.

When IEEE 802.11 media access control protocol (EDCA) is used for transmissions and RTS/CTS/block ACK or other means defined in IEEE 802.11 are used to protect transmission opportunities (TXOP), as a result of carrier sensing, a transmission between node u to v may block all transmissions within the interference range $D_I$ away from either u due to sensing RTS and DATA or v due to sensing CTS and ACK. Simultaneous link transmissions in the common mesh backhaul channel on two distinct links $e_{uv}=(u,v) \in E_b$ and $e_{ij}=(i,j) \in E_b$ are possible. That is, the two edges do not interfere if and only if the four pairs of nodes (u,i), (v,j), (u,j), (v,i) are more than $D_I$ apart. Otherwise, the two edges $e_{uv}$ and $e_{ij}$ interfere with each other. To have an interference-free transmission for a link between node u and node v $e_{uv}=(u,v) \in E_b$ on the common mesh backhaul channel, it needs to satisfies two requirements (1) $d(u, v) \leq D_T$ and (2) any other mesh router $i \in V_m$ with $d(u,i) \leq D_I$ or $d(v,i) \leq D_I$ does not transmit on the same channel when node u or node v is transmitting. Note that these results can also be extended to other commonly used interference models including a protocol model that is based on certain geometric properties.

The interference in the WMN backhaul can be modeled with the conflict graph $G'(E_b; L_b)$, where $E_b$ and $L_b$ are the sets of vertices and edges of G', respectively. Each vertex in G' corresponds to a link in the connectivity graph G (and therefore they share the same notation E). There exists an edge in $G'(E_b; L_b)$ between $e_{uv}=(u,v) \in E_b$ and $e_{ij}=(i,j) \in E_b$ if the links $e_{uvj}$ and $e_{ij}$ in G interfere with each other and cannot transmit simultaneously; that is, $d(u,i) \leq D_I$ or $d(v,i) \leq D_I$ or $d(u,j) \leq D_I$ or $d(v,j) \leq D_I$. $I(e_{uv}) \subseteq E_b$ denotes the set of edges any of whose transmission causes interference to the transmission on edge $e_{uv}=(u,v) \in E_b$ in the mesh backhaul, where $I(e_{uv})$ is called the interference neighborhood of link $e_{uv}$. Note that these results can also be extended to other commonly used interference models such as one that is based on certain geometric properties.

Using the graph theory concept, a clique here is a subset of links in connectivity graph G (a subset of vertices in conflict graph G') such that this subset of links in connectivity graph G mutually conflict with each other (that is, every two vertices in the subset of the conflict graph G' are connected by an edge). A maximal clique is a clique that cannot be extended by adding one more links in connectivity graph, (that is, cannot be extended by adding one more vertex in the conflict graph). To avoid conflict, at most one link in a maximal clique can be active at a time, implying that the total usage on these links should not exceed 1.

Another way of describing the relay interfaces of mesh routers and their interferences, assuming a constant transmission range $T_R$ and a constant interference range $I_R$, where $I_R > \alpha \cdot T_R$ ($\alpha > 1$, usually $\geq 2$), then an interference free transmission between node i and node j must satisfy the following constraints:

1) node i and node j are communicating through the same channel,
2) their Euclidian distance $DIS_{ij}$ is less than the transmission range $T_R$, and
3) for any other node k with $DIS_{ik} < I_R$ or $DIS_{jk} < I_R$ does not transmit any data when nodes i, j are communicating with each other.

These constraints are strict (required) in order to achieve a collision free scenario. According to these definitions and constraints, the interference model for the WMN backhaul can be modeled as a conflict graph $G'(V',E')$, in which the vertices are wireless links and $V'=E=\{e_{ij} | v_i,v_j \in V\}$. To generate the edge set E' in conflict graph G', an edge between two vertices is be drawn if these two wireless links cannot be used simultaneously.

Figure 1B:
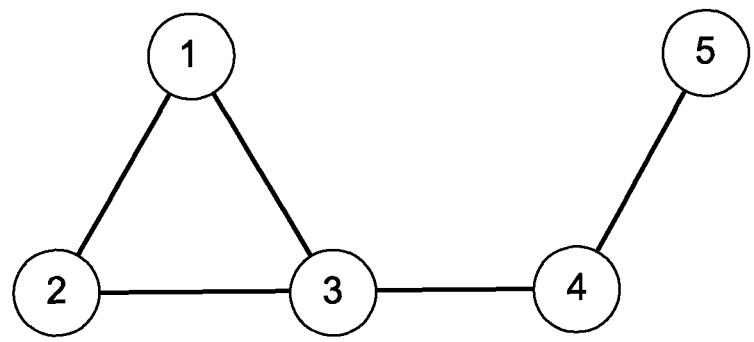
FIG. 1B is a connectivity graph.
Figure 1C:
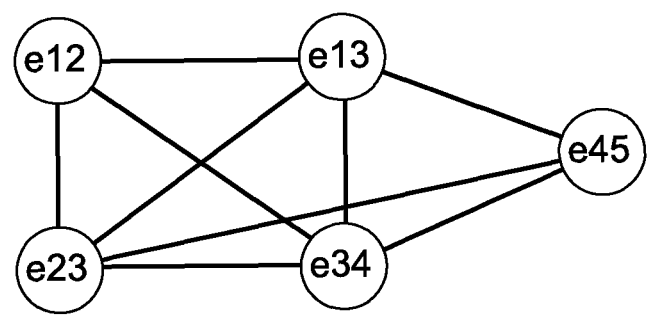
FIG. 1C is a conflicts graph.

For example, a connectivity graph and the corresponding conflict graph are shown in FIG. 1B and FIG. 1C, respectively. In these graphs, there is no edge between $e_{12}$ and $e_{45}$, so that they can transmit simultaneously.

The interference occurs only between neighboring edges in G'. Neighborhood nodes in G' for node $e_{ij}$ are defined to be $Ne^{ij}=\{e_{i'j'}$ is neighbor of $e_{ij}\}$ For applications such as video (data, content) streaming, there is a minimal requirement for the link throughput to guarantee QoS. Because of the existence of the interference from the intra-flow and inter-flow contention, for a given network, a path needs to be carefully selected to minimize contention impact.

Next, described are the link utilization and path assignment constraints in IEEE 802.11 wireless networks.

Consider constant bit rate (CBR) traffic with a constant data (bit) rate R=I*S, where S is the size of the packet and I is the number of packets sent per second. R/C cannot be used as the link consumption ratio, where C is the link capacity. This is because the protocol overhead in the IEEE 802.11 MAC layer plays a big role in bandwidth consumption. For any single hop transmission without RTS/CTS, the transmission time for a single packet with size S can be written as $$T_{PKT} = 2T_{plcp} + T_{difs} + T_{backoff} + T_{ack} + T_{sifs} + T_{hmac} + \frac{S}{C} = T_{oh} + \frac{S}{C},$$

where S is the size of the packet, $T_{backoff}$, $T_{plcp}$, $T_{difs}$, $T_{sifs}$ $T_{ack}$ and $T_{hmac}$ are the times for retransmission back-off, transmission of physical layer header, DIFS, SIFS, ACK and MAC layer headers respectively. Then the total air time/second used by this flow will be I*$T_{PKT}$, which is also the link utilization ratio for this flow.

For ease of description, it is assumed that the original content servers reside in the wired Internet and can be accessed via any wireless mesh gateway $u \in V_g$. For a content file or content clip z ($z \in Z$), which has also been cached in a subset of mesh cache servers $u \in v_{sz}(v_{sz} \subseteq v_s)$, it is also assumed that the wired Internet is not the bottleneck and the mesh gateways also have caching functions, then $V_g \subseteq V_{sz}$ since the content clip z can always be retrieved from the original content server via the mesh gateway or available on the mesh gateway. In the following, a mesh cache router (server) $u \in v_{sz}$ is either a mesh cache router (server) inside the mesh network or a mesh gateway unless it is stated otherwise.

$F_{c,z}$ denotes a flow that streams a content file z to a requesting STA c. It is assumed that the flow is a constant bit rate video. $F_{c,z}$ is also used to denote the traffic load of this flow, which is the data rate needed to transmit this flow, including the IP layer and radio layer (MAC and PHY) protocol overhead. One aspect of the method of the present invention is to select an optimal mesh cache server ($s \in v_{sz}$) and an optimal streaming path $\Lambda_{c,z}$ from the server to the requesting client to meet the QoS requirements of the streaming session. A single path routing for a flow is considered. The traffic belonging to a flow is routed on a single path between the source and destination. However, different flows may be routed on different paths even if they have the same source and destination addresses. This can be implemented by maintaining flow information in the routing and forwarding. Note that it is similar to traffic engineering in Multi-Protocol Label Switching (MPLS) networks and results in better network performance through load balancing. The traffic can be bidirectional between the mesh cache server and the client. For simplicity, only the streaming traffic from the mesh cache router to the client is considered and it is assumed that there is no traffic from the client to the mesh cache router. These results can be extended to include the control traffic from the client to the mesh cache server through flow reversal.

The path $\Lambda_{c,z}$ includes a set of links $e_{uv} \in E$ and define $$X_{c,z}(e_{uv}) = \begin{cases} 1 & e_{uv} \text{ on the path } \Lambda_{c,z} \\ 0 & \text{otherwise} \end{cases}$$

For simplicity, it is assumed that the packet size for all flows is the same, denoted by S, including IP and radio protocol headers. The packet error rate on link $e_{uv}$ is $Pe(e_{uv})$ and the maximum number of (re)transmissions on link $e_{uv}$ is $N_{uv}$. The packet delay on link $e_{uv}$ is $$T(e_{uv}) = n_{uv}\left[T_{ac}(e_{uv}) + \frac{S}{r(e_{uv})}\right] + T_{queue}(e_{uv}) \tag{1}$$

where $T_{ac}(e_{uv})$ is the channel access and radio protocol overhead delay, $r(e_{uv})$ is the data rate for link $e_{uv}=(u, v)$, $S/r(e_{uv})$ is the transmission delay, and $T_{queue}(e_{uv})$ is the queuing delay. $n_{uv}$ is the number of (re)transmissions that the packet experiences on the link $e_{uv}$. The channel access and radio protocol overhead delay depends not only on the states of the two ends of the link but also the states of all neighboring nodes due to shared nature of the medium, which can be measured through active probing or measured passively. It was shown that $T_{ac}(e_{uv})$ increases monotonically when the offered load is increased, and when the network is congested, the access delay estimation does not increase any further but holds at a steady level that depends on the number of transmitting nodes in the neighborhood. $T_{ac}(e_{uv})$ can be selected to be a conservative value. The probability that a packet is transmitted for $n_{uv}$ times on link $e_{uv}$ can be calculated as $$P(n_{uv}) = \begin{cases} P_e^{n_{uv}-1}(e_{uv})(1 - P_e(e_{uv})) & n_{uv} \leq N_{uv} \\ 0 & n_{uv} > N_{uv} \end{cases} \tag{2}$$

The average number of transmissions on link $e_{uv}$ is $$\overline{n}_{uv} = \frac{1 - P_e^{N_{uv}}(e_{uv})}{1 - P_e(e_{uv})} \tag{2A}$$

The residual packet loss rate on link $e_{uv}$ after the maximum number of (re)transmissions is $$P_r(e_{uv}) = P_e(e_{uv}) \tag{3}$$

There are different ways to model queuing delay and herein the queuing delay $T_{queue}(e_{uv})$ on link $e_{uv}$ is modeled with an exponential distribution and the probability density function (PDF) can be represented as $y_{uv}(t) \sim \lambda_{uv} e^{-\lambda_{uv} t}$, where $\lambda_{uv}$ depends on the link capacity and the traffic load. Note that these results can also be extended to other delay models. Thus, the end-to-end streaming delay that a packet experiences along a path $\Lambda_{c,z}$ is $$T_{c,z} = \sum_{e_{uv} \in E} X_{c,z}(e_{uv})T(e_{uv}) \tag{4}$$

For streaming, a packet is considered to be lost if it cannot arrive at the receiver before its playback time. The probability that the delay to stream a packet of content or content clip z along the path $\Lambda_{c,z}$ is greater than a maximum required value $T_{zmax}$ so the packet misses the playback time can be calculated as $$P[T_{c,z} > T_{zmax}] = P\left\{\sum_{e_{uv} \in E} X_{c,z}(e_{uv})T(e_{uv}) > T_{zmax}\right\} \tag{5}$$

The packet loss rate for streaming content clip z from a mesh cache server to a client can be expressed as $$P_e(c, z) = \sum_{e_{uv} \in E} P_r(e_{uv})X_{c,z}(e_{uv}) + P\left\{\sum_{e_{uv} \in E} X_{c,z}(e_{uv})T(e_{uv}) > T_{zmax}\right\} \tag{6}$$

To satisfy the QoS requirements, the packet loss rate should be less than a limit $P_{Tz}$.

$\Lambda_{c,z}(e_{uv})$ denotes the partial path for flow $F_{c,z}$ that includes all the links along the path $\Lambda_{c,z}$ up to link $e_{uv}$. Considering packet loss on the previous links, the traffic of flow $F_{c,z}$ on link $e_{uv}$ is $$f_{c,z}(e_{uv}) = \prod_{e_{ij} \in \Lambda_{c,z}(e_{uv})} [(1 - P_r(e_{ij}))X_{c,z}(e_{ij})]F_{c,z} \quad (7)$$

If the residual packet loss rate of the links is small, $f_{c,z}(e_{uv}) \approx F_{c,z}$.

$f(e_{uv})$ denotes the aggregate traffic of all flows that passes through link $e_{uv}$, then $$f(e_{uv}) = \sum_{c \in V_c, z \in Z} f_{c,z}(e_{uv}) \quad (8)$$

The following variables are defined before presenting the mathematical formulation of optimal server selection and routing problem. For any mesh router $u \in v_m$, $A(u)$ is defined to be the set of STAs that associated with mesh router u. For any STA $c \in v_c$, $M(c)$ denotes the mesh router with which STA c is associated. $\delta(u)$ denotes all the links that are incoming and outgoing on mesh router $u \in v_m$, in which $\delta^+(u)$ is the set of outgoing links from node u and $\delta^-(u)$ is the set of the incoming links to node u. If a node is not a source node or a sink node, the total outgoing flow is equal to the total incoming flow (minus the lost packets) for flow conservation.

In UNICAP, there are multiple mesh cache servers that can stream the requested content clips to clients. Multiple streaming sessions will compete for wireless bandwidth resources in the WMN. Each session has its throughput, delay and packet loss requirements in order to meet its QoS. It is desirable to support the maximum number of concurrent streaming sessions in the network and meet their QoS requirements with the finite network resources. For each streaming request for a content clip, both the mesh cache server and a streaming path for the request are optimally selected. Because the future client requests are unknown, to support more sessions in the system, the overall network resource usage given a set of existing session requests are minimized and the residual resource of the network is then maximized. Based on the models described above, an optimization problem of joint server and routing selection given a set of streaming requests, where the overall network resource usage for serving these requested streams is minimized while the QoS for all the concurrent streaming sessions and all the wireless network constraints are satisfied, is formulated. Due to shared medium, wireless links interfere with each other in a neighborhood, and the capacity available on a wireless link or in a neighborhood is limited. When determining paths for network flows from their mesh cache servers to clients, the total traffic on each selected link should not exceed the capacity not only on that link but in the interference neighborhood to prevent congestion. Furthermore, a network flow should satisfy flow conservation and does not incur routing loop when it is transmitted hop-by-hop from the source to the destination along the path.

Using the definitions and models above, the joint server and route selection problem can be mathematically formulated as $$\min \sum_{e_{uv} \in E} \frac{f(e_{uv})}{r(e_{uv})} \quad (9)$$

Subject to:

$$\sum_{v:e_{vu} \in \delta^-(u)} f_{c,z}(e_{vu})(1 - P_r(e_{vu})) = \sum_{v:e_{uv} \in \delta^+(u)} f_{c,z}(e_{uv}) \quad (10)$$

$$\forall u \in V_m - V_{sz}, c \in V_c, z \in Z;$$

$$\sum_{v:e_{uv} \in \delta^+(u)} X_{c,z}(e_{uv}) \leq 1, \quad (11)$$

$$\forall u \in V_m - V_{sz}, c \in V_c, z \in Z;$$

$$\sum_{u \in V_{sz}, v:e_{uv} \in \delta^+(u)} f_{c,z}(e_{uv}) = F_{c,z}, \forall c \in V_c, z \in Z; \quad (12)$$

$$\sum_{u \in V_{sz}, v:e_{uv} \in \delta^+(u)} X_{c,z}(e_{uv}) = 1, \forall c \in V_c, z \in Z; \quad (13)$$

$$\sum_{v:e_{vu} \in \delta^-(u)} f_{c,z}(e_{vu}) = 0, \forall u \in V_{sz}, c \in V_c, z \in Z; \quad (14)$$

$$X_{c,z}(e_{M(c)c}) = 1, \forall c \in V_c, z \in Z; \quad (15)$$

$$f(e_{cM(c)}) = 0, \forall c \in V_c; \quad (16)$$

$$f(e_{uv}) \leq r(e_{uv}), \forall e_{uv} \in E; \quad (17)$$

$$\frac{f(e_{uv})}{r(e_{uv})} + \sum_{e_{ij} \in I(e_{uv})} \frac{f(e_{ij})}{r(e_{ij})} \leq 1, \forall e_{uv} \in E_b; \quad (18)$$

$$\sum_{v:e_{uv} \in A(u)} \frac{f(e_{uv})}{r(e_{uv})} \leq 1, \forall u \in V_m. \quad (19)$$

$$P_e(c, z) = \quad (20)$$

$$\sum_{e_{uv} \in E} P_r(e_{uv})X_{c,z}(e_{uv}) + P\left\{ \sum_{e_{uv} \in E} X_{c,z}(e_{uv})T(e_{uv}) > T_{zmax} \right\} < P_{zmax}$$

Given a set of streaming requests for a set of content clips $z \in Z$ from a set of clients $c \in v_c$, one aspect of the method of the present invention is to find the server for each request and the flow path from the server to the requesting client with the objective to minimize the overall network resource usage in (9) while all the QoS and wireless network constraints are satisfied. Constraint (10) is the flow conservation constraint. At a mesh router, which is not a source (a mesh cache server that has the requested content) or a sink (a requesting client), the total outgoing flow is equal to the total incoming flow except the packet lost on the links. Constraint (11) enforces the single path routing in the mesh backhaul. At a mesh router, there is at most one outgoing link that carries a specific flow and the flow traffic should not be split at any mesh router. Constraint (12) states that a flow $F_{c,z}$ comes out of a mesh cache server that has the requested content. Note that a mesh gateway is a mesh cache server. Constraint (13) enforces the notion that for any flow, it has to use and only use one streaming server. Constraint (14) represents that there is no flow traffic coming into a mesh cache server that has cached this flow. Constraint (15) states that the flow should go through the access link from the associating mesh router to the requesting client. Constraint (16) states that the client is a sink that does not have the flow outgoing. Constraints (10)-(16) guarantee a loop-free end-to-end connection for each flow. Constraint (17) states that the link rate constraint is satisfied and no link capacity is violated. Constraints (18) and (19) account for the interference constraints. Constraint (18) shows that the links carrying concurrent flow traffics on the selected paths will not overload the network and cause congestion: That is, within the interference neighborhood of any link, the total channel utilization cannot exceed 1. Constraint (19) states that under a mesh router, its associated clients conflict with each other and the total utilization of the access channel between the mesh router and all its associated clients should not exceed 1. Constraint (20) is the QoS constraint. The packet loss rate including the packets lost during the transport in the network and the packets arrived later than the deadline should be less than a required limit.

The above mesh cache server selection and routing optimization problem is a mixed-integer LP problem which is known to be NP-hard. Heuristic computer programming methods can be used to solve this joint optimization problem. By solving this LP, an optimal solution can be obtained in terms of the minimum network resource usage under all of the above constraints, which yields an upper bound for selecting the mesh cache server and routing to serve a set of flows for the streaming sessions requested by clients.

It is clear that a centralized server selection and routing mechanism can be designed based on the above optimization problem solution. Each mesh router reports its measured link characteristics and channel interference status such as the data rate, delay, packet loss rate, and traffic load for the links with each of its neighbors to a central streaming controller. In general, a set of flows may have started in the mesh network to serve the existing client requests (a special case is that there is no active streaming session). When a client requests a new streaming session for a content clip, it contacts the streaming controller.

Once receiving a request, the controller tries to compute a solution of the above optimization problem for the client request that can serve the new and existing client streaming sessions and satisfy all of the wireless and QoS constraints. In order not to disrupt the ongoing sessions in the network, the method will not change the mesh cache servers and routes of the existing flows even if this will yield a sub-optimal solution. If a feasible solution is obtained, the controller then signals the requesting client, the selected mesh cache server and the intermediate mesh routers to establish the streaming session. If no feasible solution can be found to satisfy all the above mentioned constraints, the controller rejects this streaming request. However with UNICAP, the client can still join the P2P network to download the content in a best effort way, but the quality of service will be degraded.

Figure 2:
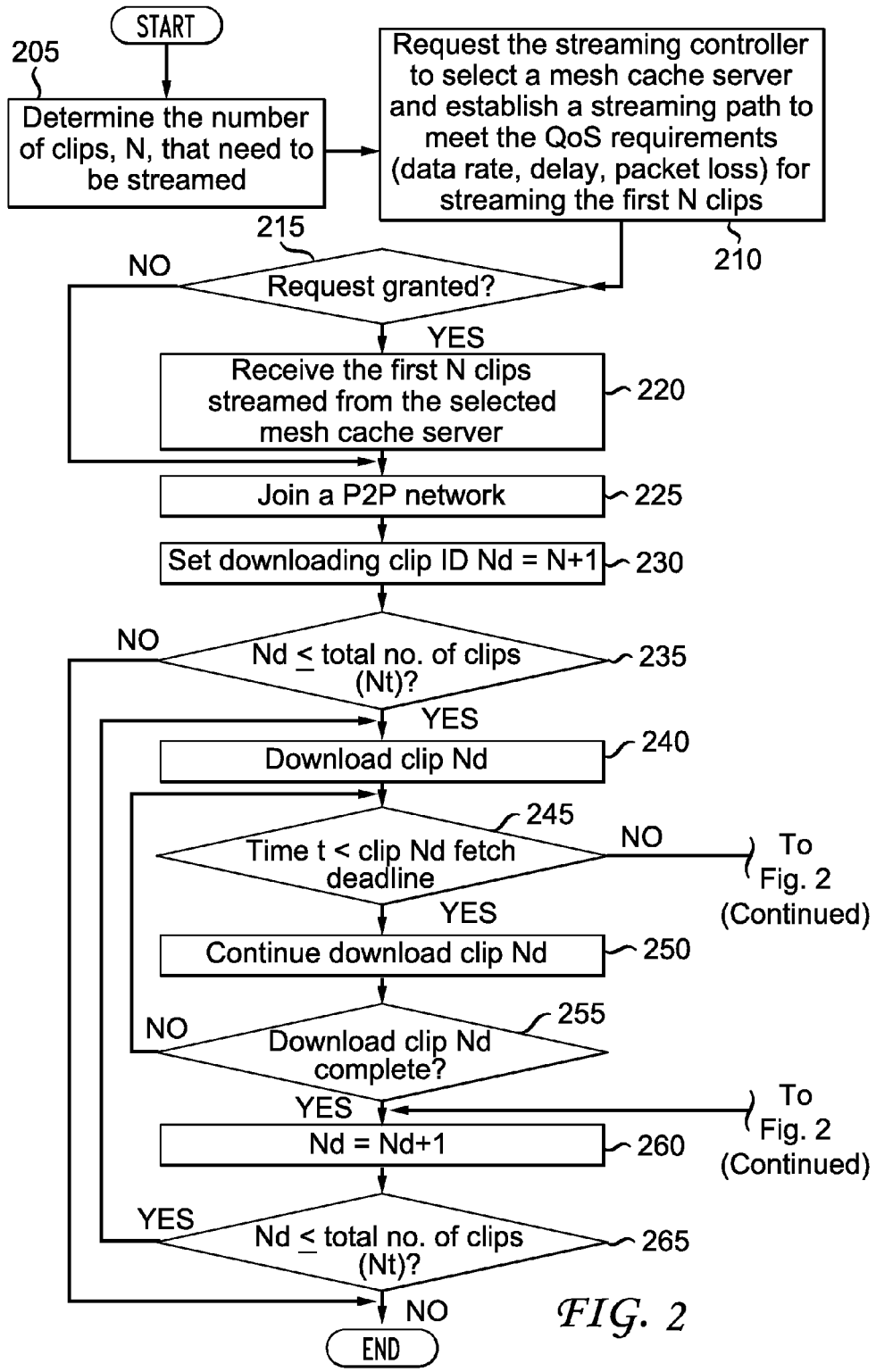
FIG. 2 is a flowchart of the operation of a client to obtain a content file by requesting clips of the content file to be streamed to it using the centralized streaming controller and downloading clips of the content file via a P2P network in accordance with the principles of the present invention.
Figure 2:
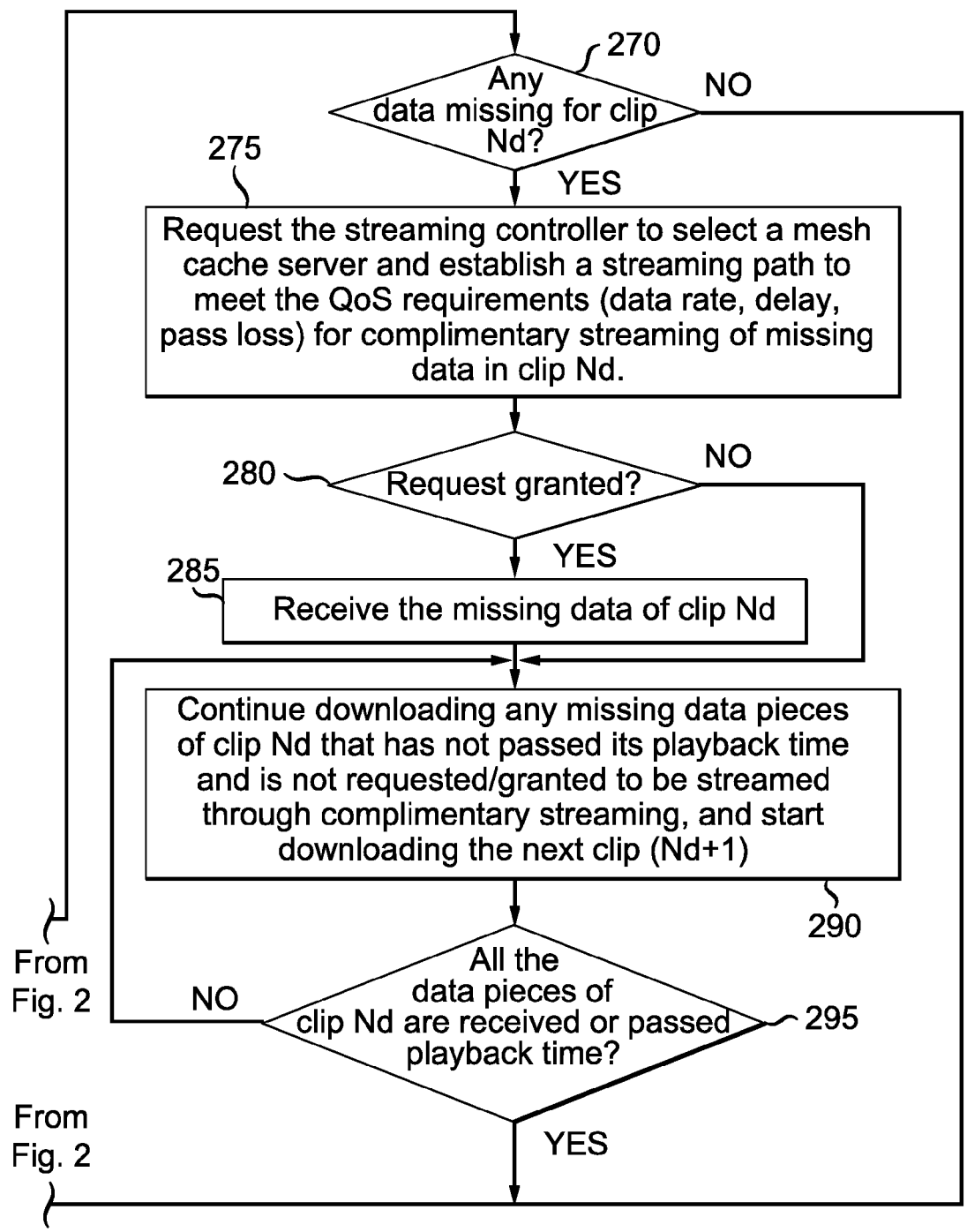

FIG. 2 is a flowchart of the operation of a client to obtain a content file by requesting clips of the content file to be streamed to it using the centralized streaming controller and downloading clips of the content file via a P2P network in accordance with the principles of the present invention. At 205 the client (user, station, mobile device, mobile terminal, . . . ) determines the number of clips (N) it needs to be streamed. Bearing in mind that this is a need in terms of QoS but that the client can still download the desired clips albeit the QoS might be degraded. At 210 the client requests the streaming controller (centralized) to establish a streaming session including selecting a mesh cache server for the client and selecting (and establishing) a streaming path (route, link, connection) between the client and the mesh cache server to meet its QoS requirements (data rate, delay, packet loss) for streaming the first N clips. At 215, a test is performed to determine if the request (210) was granted. If the request was granted then at 220 the client establishes a streaming connection with the mesh cache server and receives the first N clips streamed from the selected mesh cache server. At 225 the client joins a P2P network in order to download the clips it needs that were not streamed. If the request was not granted, then processing proceeds to 220. At 230 the client sets the identification (ID) of the clip to Nd=N+1. That is, the clip identification (ID) is set to the next clip after the last clip to be streamed (if no clips were streamed, N=0, then N+1=1). At 235 a test is performed to determine if Nd is less than or equal to the total number of clips in the desired content file (Nt). If Nd is less than or equal to the total number of clips in the desired content file (Nt), then at 240 the client downloads clip Nd. At 245 a test is performed to determine if the time deadline for receiving clip Nd is less than the time required to fetch (download) clip Nd (fetch deadline). If the time deadline for receiving clip Nd is less than the time required to fetch (download) clip Nd (fetch deadline) then at 250 the client continues to download clip Nd. At 255 a test is performed to determine if clip Nd has completed being downloaded. If clip Nd has completed being downloaded then at 260 the clip ID is incremented by 1. At 265 a test is performed to determine if the clip ID is still less than or equal to the total number of clips (Nt). If the clip ID is still less than or equal to the total number of clips (Nt) then processing proceeds to 240. If the clip ID is still greater than the total number of clips (Nt) then processing ends. If clip Nd has not completed being downloaded then processing proceeds to 245. If Nd is greater than the total number of clips in the desired content file (Nt) then processing ends. If the time deadline for receiving clip Nd is less than the time required to fetch (download) clip Nd (fetch deadline) then processing proceeds to 270. At 270 a test is performed to determine if there is any data missing from clip Nd. If there is any data missing from clip Nd then at 275 the streaming controller is requested to select a mesh cache server and to select a streaming path to meet the QoS requirements (data rate, delay, packet loss) for complimentary streaming of any data missing from clip Nd. A test is performed at 280 to determine if the request (275) was granted. If the request was granted then at 285 the client receives the missing data from clip Nd. At 290 the client continues downloading any missing data (pieces, sub-clips) of clip Nd that has not already passed its playback time and for which a streaming (complimentary) request has not already been requested and granted. The client also starts downloading the next clip (Nd+1). If the request (275) was not granted then processing proceeds to 290. At 295 a test is performed to determine if all of the data (pieces, sub-clips) of Nd have been received or passed their playback time. If all of the data (pieces, sub-clips) of Nd have been received or passed their playback time then processing proceeds to 260, If all of the data (pieces, sub-clips) of Nd have not been received and they have not passed their playback time then processing proceeds to 290. If there is no data missing from clip Nd then processing proceeds to 260.

Figure 3:
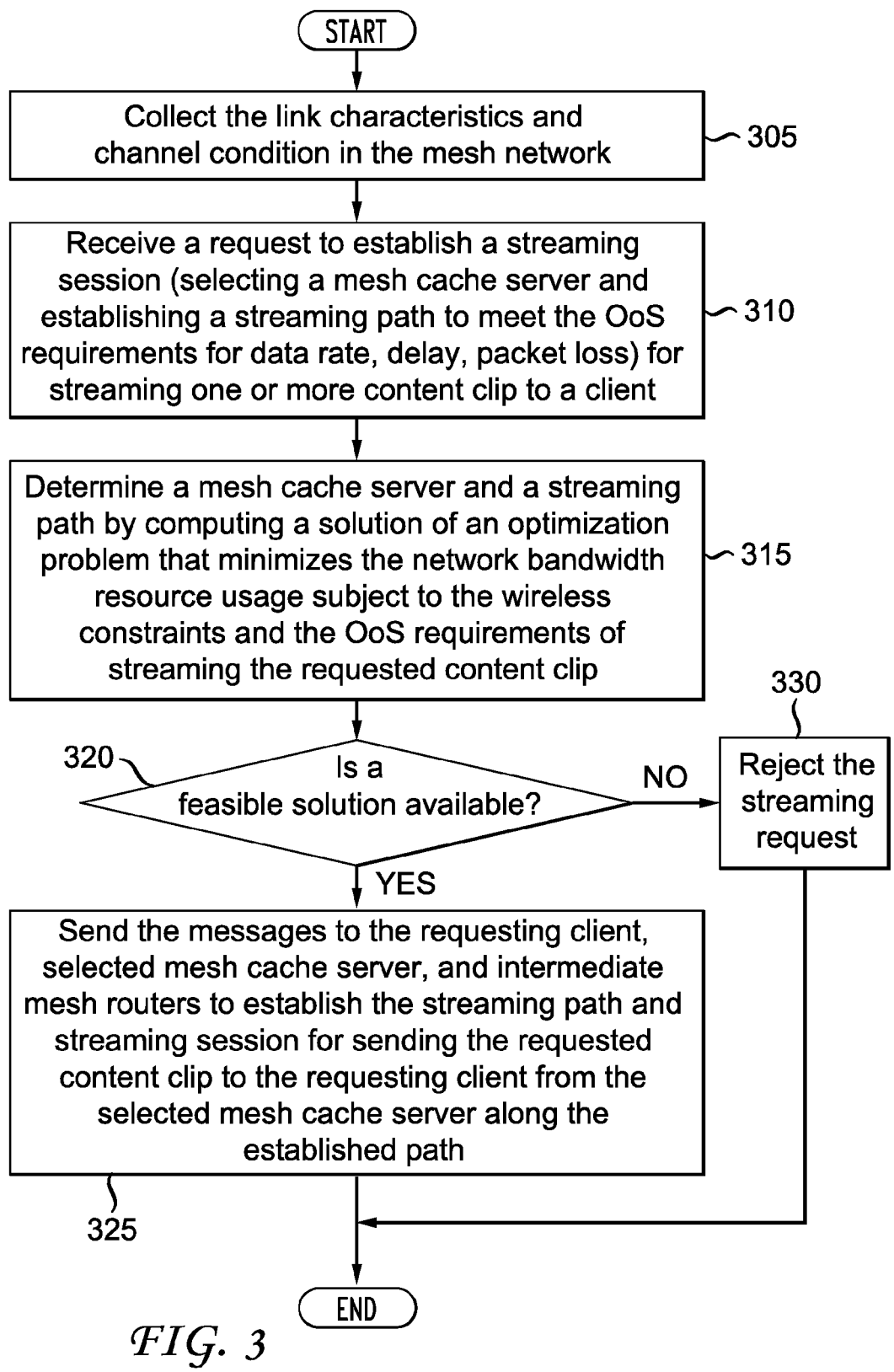
FIG. 3 is a flowchart of the operation of the streaming controller to select a mesh cache server and routing for streaming the content clip to a requesting client in accordance with the principles of the present invention.

FIG. 3 is a flowchart of the operation of the streaming controller to select a mesh cache server and routing for streaming the content clip to a requesting client in accordance with the principles of the present invention. At 305 the streaming controller collects (gathers) the link characteristics and channel conditions in the mesh network. At 310 the streaming controller receives a request to establish a streaming session (including selecting a mesh cache server and selecting (and establishing) a streaming path (route, link, connection) between the client and the mesh cache server to meet its QoS requirements (data rate, delay, packet loss) for streaming the first N clips. At 315, the streaming controller determines if a mesh cache server and streaming path (route) can be selected by solving an optimization problem that minimizes network bandwidth resource usage subject to wireless constraints and the QoS requirements of streaming the requested content clip(s). At 320 a test is performed to determine if a feasible solution was available. If a feasible solution was available then at 325 the streaming controller sends a message to the requesting client including the selected mesh cache server and intermediate routers to establish the streaming path (route) and streaming session between the client and the mesh cache server for streaming the requested content clip to the requesting client from the selected mesh cache server along the established streaming path (route, connection). If a feasible solution was not available then at 330 the streaming controller sends the client a message rejecting the request.

In practical scenarios, there may be more interest in a distributed mechanism. A heuristic distributed QoS routing mechanism to discover and select the mesh cache server, and establish the route from the selected server to the client that meets the QoS requirements of the streaming session is described next. Its performance will be compared with that of the optimal solution below.

To achieve the per-flow QoS routing, the mesh routers exchange their measured link characteristics and channel interference status such as the link data rate, the link packet loss rate, and the link traffic load to each of its neighbors within three hops in the neighborhood by embedding and carrying this information in the beacons. Note that beacons are generally transmitted in a robust physical layer mode with higher transmission range and reliability in IEEE 802.11. Each mesh router maintains its own link characteristics as well as the link characteristics of its neighbors.

One aspect of the present invention is to discover a mesh cache server and a streaming path with the minimum path cost and to satisfy the interference constraints and flow QoS requirements. The AODV routing protocol is enhanced for this purpose and uses the airtime cost defined in the IEEE 802.11s as routing metric. Airtime reflects the amount of channel resources consumed by transmitting a packet over a particular link. Its value for a link e is calculated as $w(e)=[O+s/r(e)](1/(1-P_e(e)))$, where O is the radio protocol overhead as defined in the IEEE 802.11s, S is the test packet size, r(e) the link data rate, and $P_e(e)$ the link packet loss rate. The cost of a path is the summation of the cost of the constituting links.

AODV is enhanced in the following aspects to support the mesh cache server selection and QoS routing. (1) Per-flow routing is used for each request. The routing table on each mesh router is not unique only to the destination address because there may be different paths for different flows between two nodes. A destination client assigns an ID for each of its flow. A unique (destination, flow ID) pair is used to determine the unique path for each flow. (2) Each mesh router should maintain a flow routing table to keep the information of all the flows to/from itself. The information includes the ID of the flow, the destination address, the amount of reserved bandwidth and status. The state of flow routing table entry can be one of the following states (values): invalid, pre-admitted, reserved, and activated. The state established at each hop for a flow is "soft state" and automatically expires when no longer needed. (3) The extra information fields are added to the routing protocol messages to help distribute the topology and flow information among the nodes in the WMN, including the flow ID, the requested bandwidth for the flow, the address list, the maximum delay and packet loss rate limits/thresholds allowed by the flow as well as the aggregate packet delay and aggregate packet loss rate. During route discovery, each node records its own address in the address list of the RREQ message as it forwards the RREQ message. The RREQ carries the sequence of hops, over which this copy of the RREQ was forwarded. That is, the RREQ carries a reverse route to the originating node of the RREQ. The RREP carries the explicit route from the RREQ originating node, through a sequence of hops, to the destination. The aggregate packet delay and packet loss rate fields indicate the expected total delay and packet loss rate from the message originator to the node receiving the message. In addition, the routing control messages include the requested content ID so a mesh cache server can know whether it has cached the requested content clip. It is assumed that the content IDs are uniquely assigned by a scheme. (4) A new route confirmation (RCFM) message is defined, which includes the fields of the selected mesh cache server and the node address list for the explicit streaming path as well as the flow ID, the client address, and required bandwidth. Since the mesh router that originated the route discovery at the request of its associated client may receive multiple RREPs from multiple mesh cache servers that have cached the requested content clip. Each of RREP represents a unique path satisfying the interference constraints and flow QoS requirements. The mesh router that originated the path discovery needs to confirm which mesh cache server and steaming path are selected.

Figure 4:
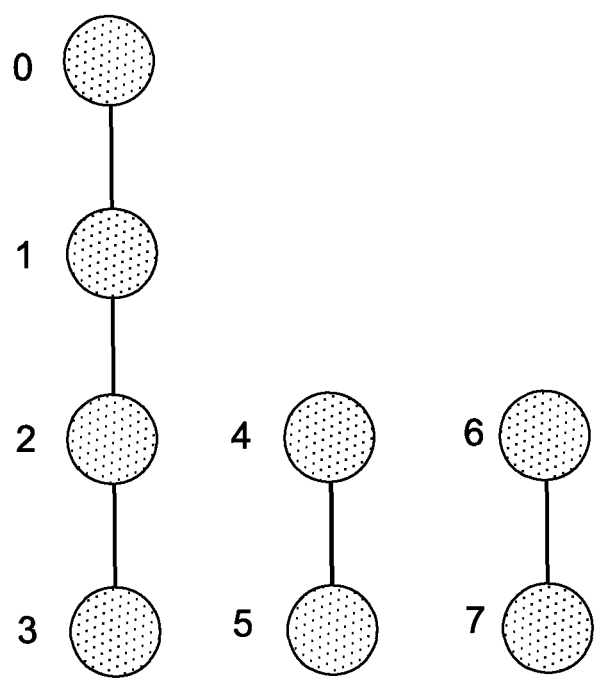
FIG. 4 is used to show interference.

To discover and select the mesh cache server and establish the route from the selected server to the client for a streaming session, the client informs its associated mesh router of its request. The mesh router checks the constraint (19) to decide if there is enough bandwidth to serve this flow in the access BSS. If the constraint (19) is satisfied, the mesh router broadcasts an enhanced RREQ message to its neighbors to initiate the server and router discovery in the mesh backhaul. Otherwise, the request will be rejected. Upon receiving a RREQ, each intermediate node calculates the aggregate metric for the reverse path to the RREQ originator. The intermediate node also performs the pre-admission. In the pre-admission, the node calculates the traffic load introduced by the requested flow on the previous links forwarded by the RREQ. Then the intermediate node determines if the interference constraint (18) would be satisfied for the incoming link from which it received the RREQ if the new flow were admitted on the reverse path from this node to the RREQ originator. The intermediate node also determines if the interference constraint (18) is satisfied for all the other links in the interference neighborhood of the RREQ incoming link if the requested flow is admitted on the reverse path to the RREQ originator. Since the next hop on the path is not known yet, the traffic load generated on the next hop link by the requested flow is not considered in the pre-admission. For example in FIG. 4, if node 2 (an intermediate node, a forwarding node) receives a RREQ from link $e_{12}$ that was originated by node 0, node 2 will make sure that the interference constraints for link $e_{21}$ are met after adding the new flow on links $e_{21}$ and $e_{10}$. That is, the total channel utilization on the links $e_{21}$, $e_{10}$, $e_{32}$, and $e_{45}$ does not exceed 1, assuming that link $e_{21}$ interferes with link $e_{45}$, but does not interfere with link $e_{67}$. Furthermore, in order not to degrade the QoS of the existing flows on link $e_{45}$ (link $e_{45}$ is in the interference neighborhood of link $e_{21}$), node 2 needs to make sure that the interference constraint for link $e_{45}$ is not violated after adding the new flow. That is, the total channel utilization on link $e_{45}$ and the links interfering with link $e_{45}$ (links $e_{21}$, $e_{10}$, $e_{32}$, and $e_{67}$) does not exceed 1. The intermediate node also ensure that the QoS requirement of the flow can be satisfied by checking if the values of the aggregate delay and the aggregate packet loss rate on the reverse path are less than the delay and packet loss rate limits allowed by the flow, respectively.

If the interference constraints and the flow QoS requirements can be met, the intermediate (forwarding) node will pre-admit the requested flow. The intermediate (forwarding)

node inserts an entry into its flow table and set the status of this entry to be "pre-admitted" with a pre-admission timeout. The entry will be removed at the expiration of the pre-admission timer if a corresponding RREP has not been received. If the interference constraints and QoS requirements cannot be satisfied, then the node silently discards the RREQ. Although the pre-admission underestimates the aggregate load introduced by the new flow, it is useful as the first pass to weed out certain non-qualified routes.

After pre-admission of a flow, if the intermediate node does not cache the requested content file, the intermediate (forwarding) node updates the corresponding fields in the RREQ message and forwards (rebroadcasts) the updated RREQ. If the intermediate (forwarding) node is a mesh cache server and has cached the requested content clip, the node that received the RREQ formally admits the flow and changes the state of the entry in the flow (routing) table to "reserved" state with a reservation timeout. It then sends a RREP along the reverse path towards the RREQ originator. Note that multiple copies of the RREQ might arrive along different paths to the destination. To increase the possibility of discovering a qualifying path, the target sends back a RREP for each copy of the valid RREQ along the reverse path established by the RREQ.

The RREP carries the intended path information, which is a list of nodes that have pre-admitted the flow during the RREQ processing. At each forwarding node (intermediate node) of the RREP, the formal admission control is performed. The formal admission is similar to the pre-admission but it takes into account of the traffic load introduced by the new flow on all the links on the intended path. Once a forwarding node receives a RREP, the intermediate node makes admission decision by checking if the interference constraint (18) would be satisfied for the incoming link of the RREP as well as for all the other links in the interference neighborhood, if the new flow is carried on the intended path. The intermediate node further ensures that the QoS requirement of the flow can be satisfied. That is, a test is performed to determine if the values of the aggregate delay and the aggregate packet loss rate on the path from it to the RREP originator are less than the delay and packet loss rate limits allowed by the flow, respectively. If admitted, the state of the entry in the flow table is changed to "reserved" with a reservation timeout, and the RREP is updated and forwarded. The entry will be removed if the RCFM is not received by the expiration of the associated reservation timer.

The RREQ originator may receive multiple valid RREPs, each having a different path or different mesh cache server. The RREQ originator then selects a mesh cache server and a streaming path with the minimum path cost, and sends the RCFM confirmation message to the selected mesh cache server along the selected path. Once the forwarding node (intermediate node) or selected mesh cache server receives the RCFM, the receiver changes the state of the corresponding routing entry in the flow table to "activated". Like the original AODV, the active routing entry also has a lifetime. The route becomes invalid if it has not been used to forward data for the lifetime.

Figure 5:
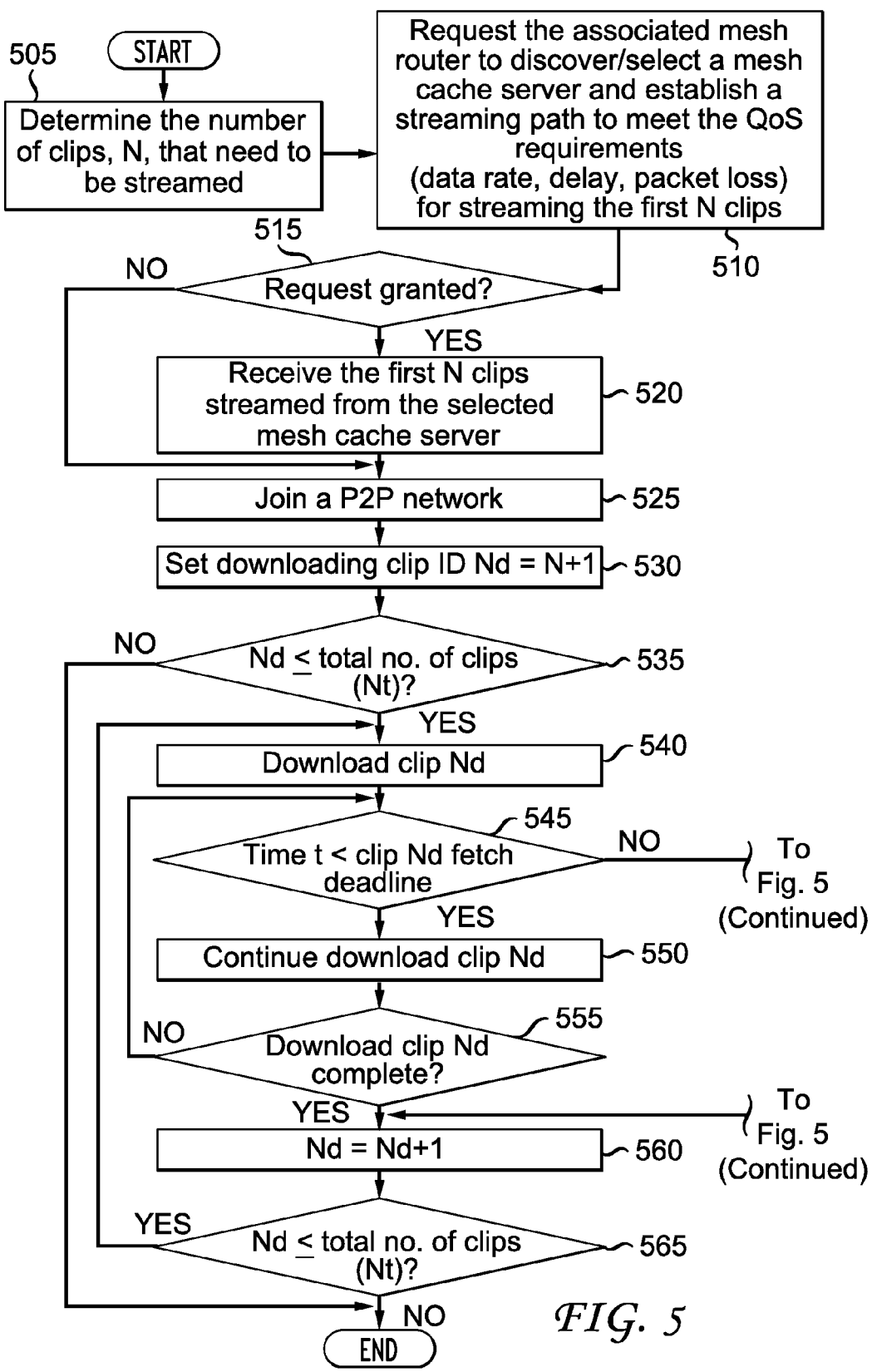
FIG. 5 is a flowchart of the operation of a client to obtain a content file by requesting clips of the content file to be streamed to it using the distributed method to discover and select a mesh cache server and QoS routing as well as downloading clips of a content file via a P2P network in accordance with the principles of the present invention.
Figure 5:
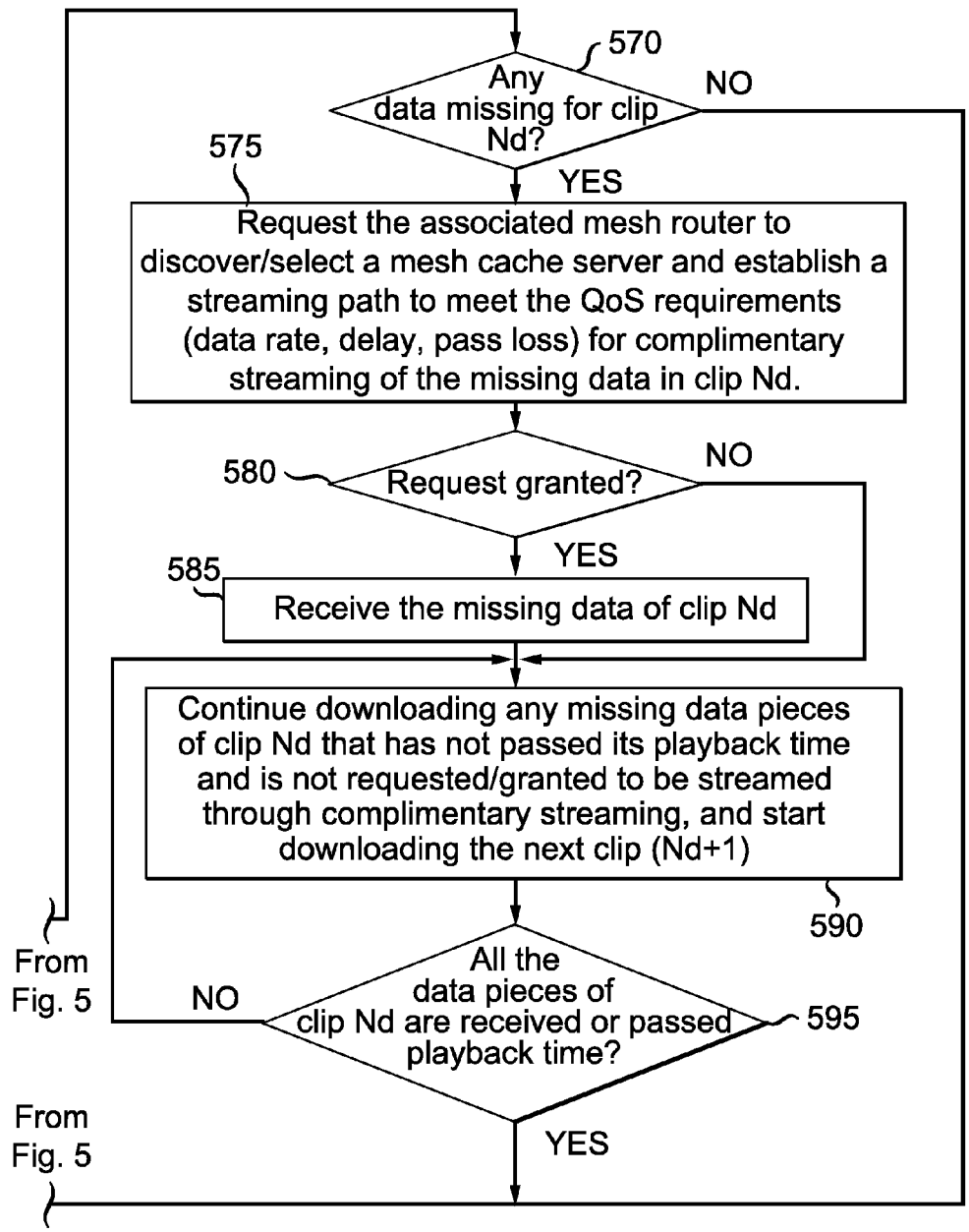

FIG. 5 is a flowchart of the operation of a client to obtain a content file by requesting clips of the content file to be streamed to it using the distributed method to discover and select a mesh cache server and QoS routing as well as downloading clips of the content file via a P2P network in accordance with the principles of the present invention. At 505 the client (user, station, mobile device, mobile terminal, . . . ) determines the number of clips (N) it needs to be streamed. Bearing in mind that this is a need in terms of QoS but that the client can still download the desired clips albeit the QoS might be degraded. At 510 the client requests it associated mesh cache router to discover and select a mesh cache server and establish a streaming path (route, connection) to meet its QoS requirements (data rate, delay, packet loss) for streaming the first N clips. At 515, a test is performed to determine if the request (510) was granted. If the request was granted then at 520 the client establishes a streaming connection with the mesh cache server and receives the first N clips streamed from the selected mesh cache server. At 525 the client joins a P2P network in order to download the clips it needs that were not streamed. If the request was not granted, then processing proceeds to 520. At 530 the client sets the identification (ID) of the clip to Nd=N+1. That is, the clip identification (ID) is set to the next clip after the last clip to be streamed is any clips were streamed. At 535 a test is performed to determine if Nd is less than or equal to the total number of clips in the desired content file (Nt). If Nd is less than or equal to the total number of clips in the desired content file (Nt), then at 540 the client downloads clip Nd. At 545 a test is performed to determine if the time deadline for receiving clip Nd is less than the time required to fetch (download) clip Nd (fetch deadline). If the time deadline for receiving clip Nd is less than the time required to fetch (download) clip Nd (fetch deadline) then at 550 the client continues to download clip Nd. At 555 a test is performed to determine if clip Nd has completed being downloaded. If clip Nd has completed being downloaded then at 560 the clip ID is incremented by 1. At 565 a test is performed to determine if the clip ID is still less than or equal to the total number of clips (Nt). If the clip ID is still less than or equal to the total number of clips (Nt) then processing proceeds to 540. If the clip ID is still greater than the total number of clips (Nt) then processing ends. If clip Nd has not completed being downloaded then processing proceeds to 545. If Nd is greater than the total number of clips in the desired content file (Nt) then processing ends. If the time deadline for receiving clip Nd is less than the time required to fetch (download) clip Nd (fetch deadline) then processing proceeds to 570. At 570 a test is performed to determine if there is any data missing from clip Nd. If there is any data missing from clip Nd then at 575 the client's associated mesh cache router is requested to discover and select a mesh cache server and establish a streaming path (route, connection) to meet the QoS requirements (data rate, delay, packet loss) for complimentary streaming of any data missing from clip Nd. A test is performed at 580 to determine if the request (575) was granted. If the request was granted then at 585 the client receives the missing data from clip Nd. At 590 the client continues downloading any missing data (pieces, sub-clips) of clip Nd that has not already passed its playback time and for which a streaming (complimentary) request has not already been requested and granted. The client also starts downloading the next clip (Nd+1). If the request (575) was not granted then processing proceeds to 590. At 595 a test is performed to determine if all of the data (pieces, sub-clips) of Nd have been received or passed their playback time. If all of the data (pieces, sub-clips) of Nd have been received or passed their playback time then processing proceeds to 560, If all of the data (pieces, sub-clips) of Nd have not been received and they have not passed their playback time then processing proceeds to 590. If there is no data missing from clip Nd then processing proceeds to 560.

Figure 6:
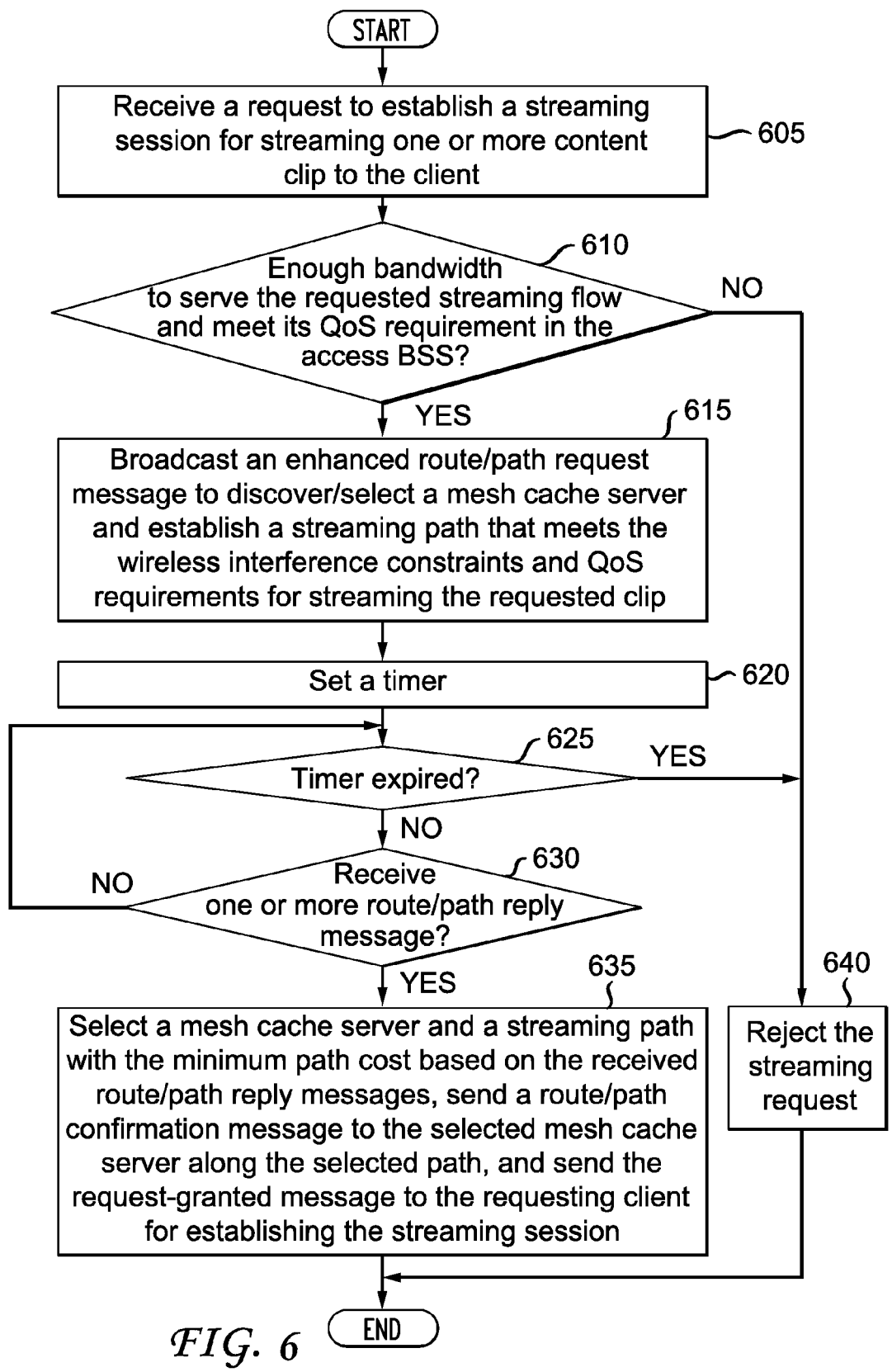
FIG. 6 is a flowchart of the operation of a mesh cache router to initiate a request to discover and select a mesh cache server and a streaming path in accordance with the principles of the present invention.

FIG. 6 is a flowchart of the operation of a mesh cache router to initiate a request to discover and select a mesh cache server and a streaming path in accordance with the principles of the present invention. At 605 the mesh cache router receives a request from one of its associated clients to establish a streaming session for streaming one or more content clips. At 610 a test is performed to determine if there is enough bandwidth to serve the requested streaming flow and meet its QoS requirement in the access BSS. If there is enough bandwidth to serve the requested streaming flow and meet its QoS requirement in the access BSS at 615 the mesh cache router broadcasts an enhanced route (path, connection) request message to discover and select a mesh cache server and establish a streaming path (route) that meets the wireless interference constraints and QoS requirements for streaming the requested clip. At 620 the mesh cache router sets a timer. At 625 a test is performed to determine if the timer expired. If the timer has not expired then a test is performed at 630 to determine if the mesh cash router has received one or more route (path) reply messages. If the mesh cache router has received one or more reply messages then at 635 the mesh cache router selects a mesh cache server and a streaming path (route, connection) with the minimum path cost based on information in the received route (path, connection) reply messages (assuming there was more than one reply message which means that the mesh cache router has a choice). The mesh cache router also sends (transmits) a route (path, connection) confirmation message to the selected mesh cache server along the selected path and also sends a request granted message to the requesting client for establishing the streaming session. If the mesh cash router has not received any route (path) reply messages then processing proceeds to 625. If the timer has expired then at 640 the mesh cache router rejects the streaming request and sends a rejection message to the associated requesting client. If there is not enough bandwidth to serve the requested streaming flow and meet its QoS requirement in the access BSS then processing proceeds to 640.

Figure 7:
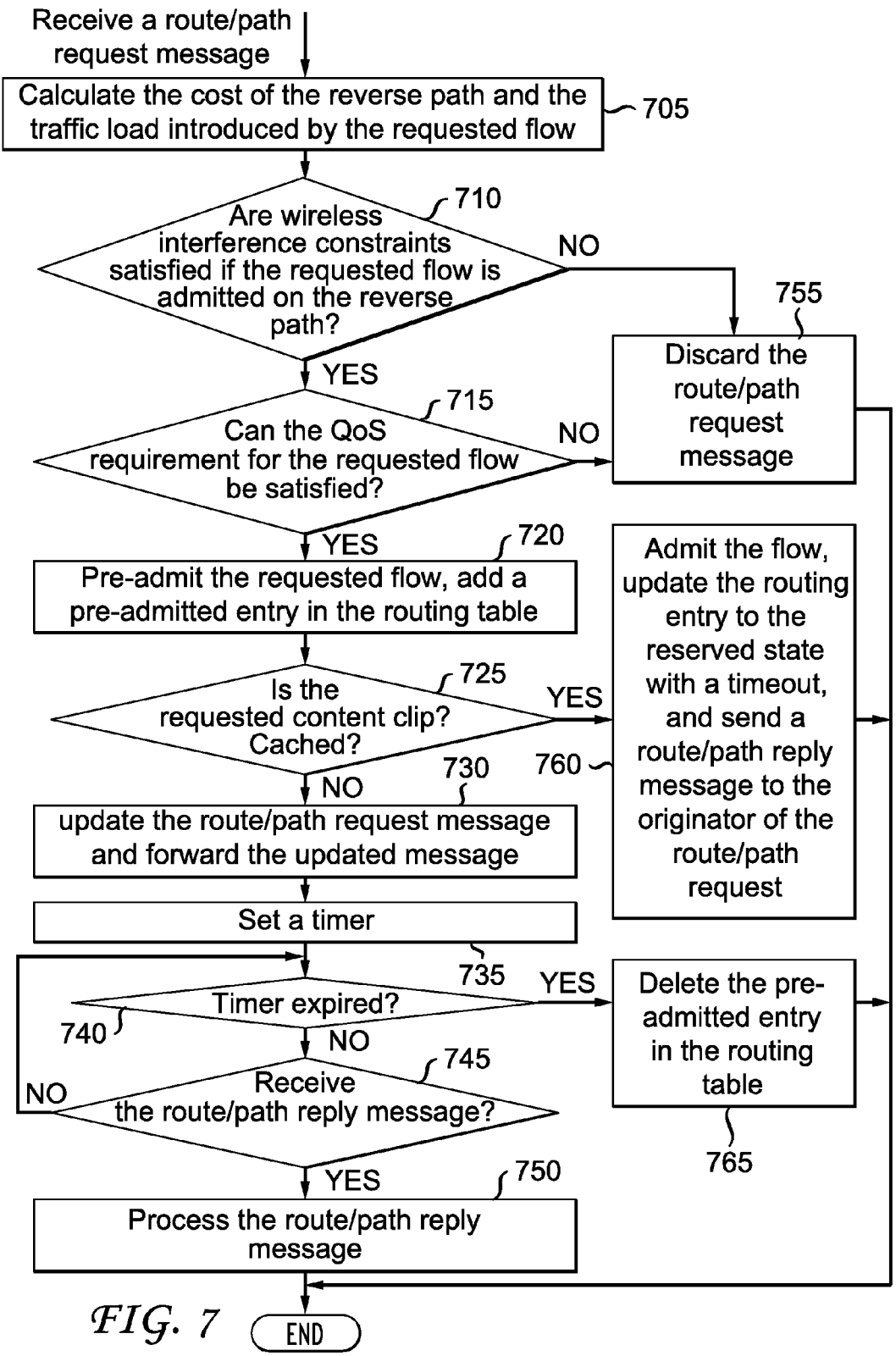
FIG. 7 is a flowchart of the operation of a mesh cache router (intermediate node) receiving a route (path, link) request (RREQ) message for discovering and selecting a mesh cache server and a streaming path in accordance with the principles of the present invention.

FIG. 7 is a flowchart of the operation of a mesh cache router (intermediate node) receiving a route (path, link) request (RREQ) message for discovering and selecting a mesh cache server and a streaming path in accordance with the principles of the present invention. At 705 the mesh cache router calculates the cost (metric) of the reverse path (route, connection) and the traffic load introduced by the requested flow. At 710 a test is performed to determine if the wireless interference constraints would be satisfied if the requested flow is admitted on the reverse path. If the wireless interference constraints would be satisfied if the requested flow is admitted on the reverse path then at 715 a test is performed to determine if the QoS requirements for the requested flow would be satisfied if the requested flow is admitted. If the QoS requirements for the requested flow would be satisfied if the requested flow is admitted then at 720 then the requested flow is pre-admitted and a pre-admitted entry is entered into the routing table. At 725 a test is performed to determine if the requested content clip is cached by this mesh cache router, i.e. the requested content clip is in the cache of this mesh cache router. If the requested content clip is not cached then at 730 the route (path, connection) request message is updated and forwarded. At 735 a timer is set. At 740 a test is performed to determine if the timer has expired. If the timer has not expired then at 745 a test is performed to determine if the mesh cache router has received a route (path, connection) reply message. If the mesh cache router has received a route (path, connection) reply message then at 750 the route (path, connection) reply message is processed. If mesh cache router has not received a route (path, connection) reply message the processing proceeds to 740. If the timer has expired then at 765 the mesh cache router deletes the pre-admitted entry in the routing table. If the requested content clip is cached then at 760 the flow is admitted and the routing entry is updated to reserved state with a timeout. A route (path, connection) reply message is sent (transmitted, forwarded) to the originator of the route (path, connection) request. If the QoS requirements for the requested flow would not be satisfied if the requested flow is admitted then at 755 the mesh cache router discards the route (path, connection) request message.

Figure 8:
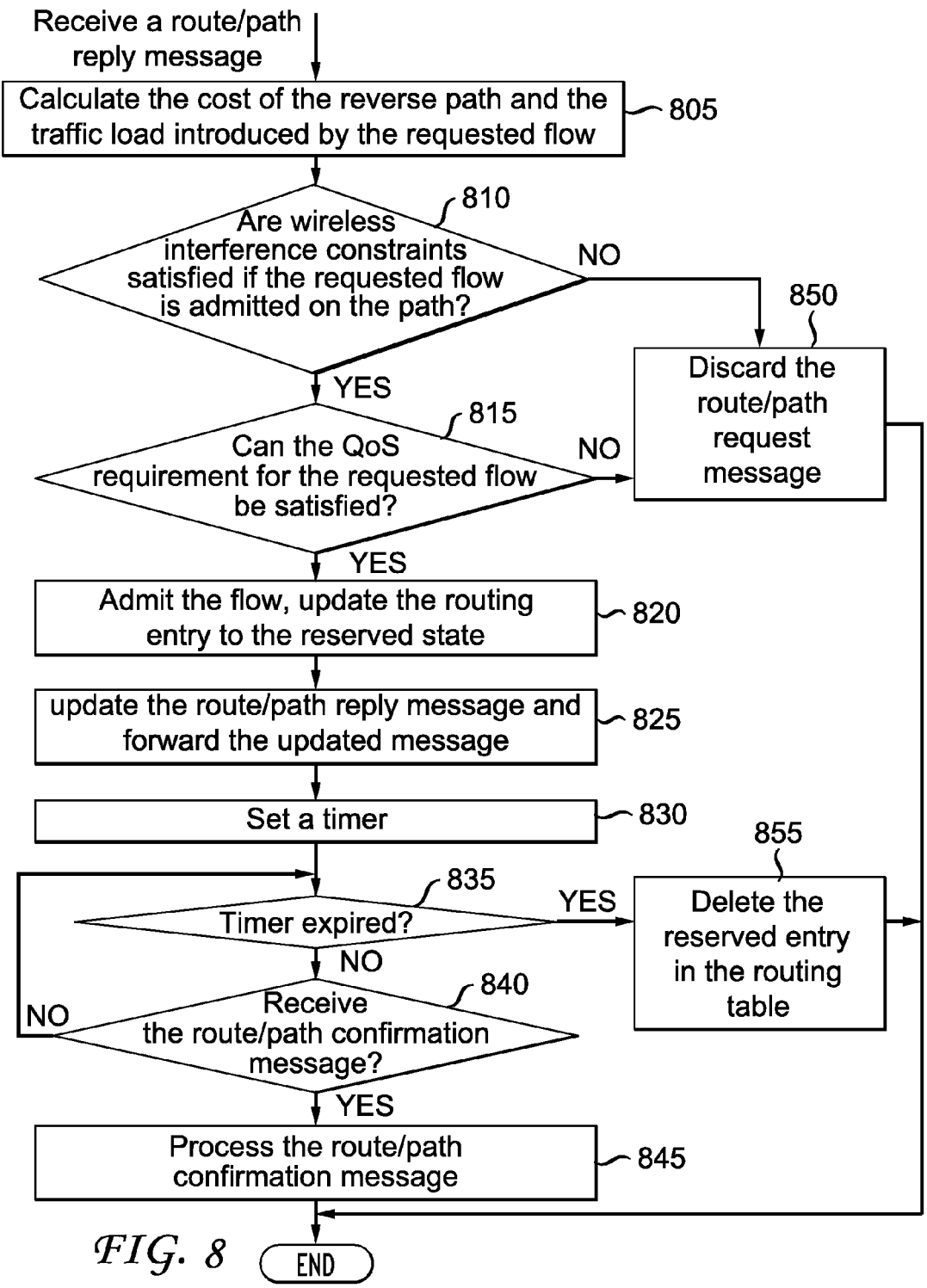
FIG. 8 is a flowchart of the operation of a mesh cache router (intermediate node) receiving a route (path, link) reply (RREP) message in accordance with the principles of the present invention.

FIG. 8 is a flowchart of the operation of a mesh cache router (intermediate node) receiving a route (path, link) reply (RREP) message in accordance with the principles of the present invention. At 805 the mesh cache router calculates the cost (metric) of the reverse path (route, connection) and the traffic load introduced by the requested flow. At 810 a test is performed to determine if the wireless interference constraints would be satisfied if the requested flow is admitted on the forward path. If the wireless interference constraints would be satisfied if the requested flow is admitted on the reverse path then at 815 a test is performed to determine if the QoS requirements for the requested flow would be satisfied if the requested flow is admitted. If the QoS requirements for the requested flow would be satisfied if the requested flow is admitted then at 820 then the requested flow is admitted and the entry in the routing table is updated to the reserved state. At 825 the route (path, connection) reply message is updated and forwarded. At 830 a timer is set. At 835 a test is performed to determine if the timer has expired. If the timer has not expired then at 840 a test is performed to determine if the mesh cache router has received a route (path, connection) confirmation message. If the mesh cache router has received a route (path, connection) confirmation message then at 845 the route (path, connection) confirmation message is processed. If mesh cache router has not received a route (path, connection) confirmation message then processing proceeds to 835. If the timer has expired then at 855 the mesh cache router deletes the reserved entry in the routing table. If the QoS requirements for the requested flow would not be satisfied if the requested flow is admitted then at 850 the mesh cache router discards the route (path, connection) request message.

Figure 9:
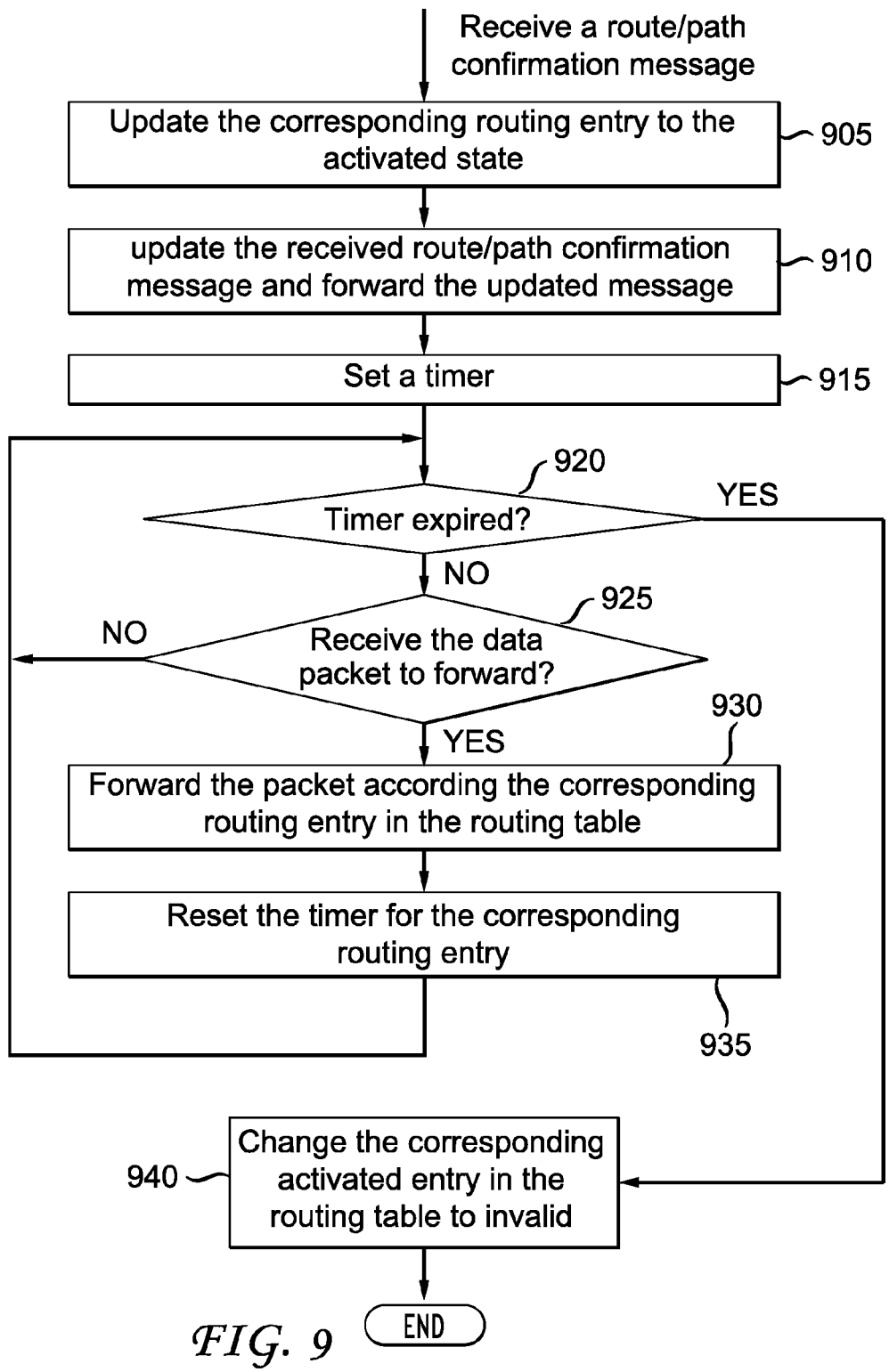
FIG. 9 is a flowchart of the operation of a mesh cache router (intermediate node) receiving a route (path, link) confirmation (RCFM) message in accordance with the principles of the present invention.

FIG. 9 is a flowchart of the operation of a mesh cache router (intermediate node) receiving a route (path, link) confirmation (RCFM) message in accordance with the principles of the present invention. At 905 the mesh cache router updates the corresponding routing entry to the activated state. At 910 the mesh cache router updates the received route (path, connection) confirmation message and forwards the updated message. At 915 a timer is set. At 920 a test is performed to determine if the timer has expired. If the timer has not expired then at 925 a test is performed to determine if the mesh cache router has received the data to forward. If the mesh cache router has received the data to forward then at 930 the mesh cache router forwards the data according to the corresponding routing entry in the routing table. At 935 the mesh cache router resets the timer for the corresponding routing entry. Processing proceeds to 920. If the timer has expired then at 940 the mesh cache router changes the corresponding activated entry in the routing table to invalid. In UNICAP, P2P data fetching is used to further reduce the load imposed on the server and network. P2P data fetching is in a best effort way. A BitTorrent-like P2P architecture is used which requires a known directory server, the tracker, for each different video clip. By using the tracker, the P2P search problem is leveraged, and the tracker is not involved in content distribution. One assumption in UNICAP is that each participant is willing to share the content it has with others and there is no free rider punishment.

As discussed before, the P2P overlay network in UNICAP includes mesh cache servers and client devices. Actually, these mesh cache servers function as "seeds" in a P2P network. The data can be fetched from the mesh cache servers initially and then exchanged among the peer devices.

In BitTorrent, the chunk selection algorithm is rarest first, which means that the chunk whose availability is the lowest throughout the network is selected first. This algorithm can help to improve the diversity of the content. However, BitTorrent is a P2P file sharing system and it does not have time constraints for data downloading so that the data could be downloaded regardless of the order, the rarest chunk always has the highest priority. But for UNICAP, which is a streaming-centric framework, the data (video, content) has to be played according to a time order, so the rarest first strategy is not suitable for UNICAP. An efficient chunk selection algorithm is to make sure the chunk selected can satisfy the video playback requirement.

In UNICAP, a "most urgent first" (MUF) scheme is defined to help with the rarest first scheme of BitTorrent. It is assumed that each peer has a playback buffer of limited size. This is due to the fact that most P2P streaming applications today do not use hard disk but only memory. The reason to use the help of rarest first selection is that the later joining client could also help the client who starts the VoD earlier.

Once a peer joins the VoD session, it first requests and receives a peer list from the tracker and tries to find good peers according to the peer selection method of the present invention. The tracker provides a list of available peers with which to associate and also a list of content and which peers have the desired content (data, video). In every update interval, the peer updates the peer list from the tracker to add the new peers to its own peer set. There are two kinds of peer selection schemes in UNICAP, one is to select the mesh cache server and the other is to select the client peer. Each peer maintains an "interested" peer set and others are in an "uninterested" set. A peer only sends requests to the other peers in the interested peer set. Peer A is interested in peer B when peer B has the chunk peer A does not have and will request eventually. In the BitTorrent algorithm, there is another choke algorithm which is not used in the UNICAP method of the present invention because it is assumed each peer will cooperate in UNICAP and no free rider exists. In the interested peer set, there is an active peer set, and a peer only sends streaming requests to peers in the active peer set. In the present invention, cache servers in good condition are always in the active peer set. As used herein, good condition means the peer selection metric from the server to the peer is good. At the beginning, peers can send the first several chunk requests to the best cache servers if the peer cannot identify the active peer set in time.

The present invention can be implemented at the link (media access control) layer (layer 2) of the network protocol stack, or implemented at the network layer (IP) layer (layer 3), or implemented above the network (IP) layer (layer 3), or transport layer or as an application.

Figure 10:
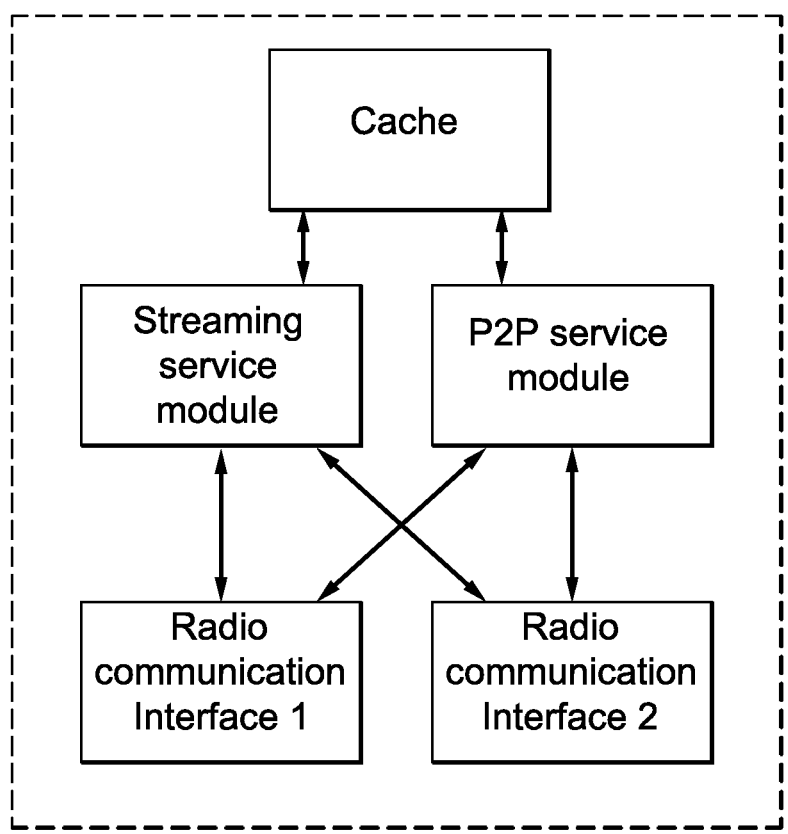
FIG. 10 is a block diagram of an exemplary wireless mesh cache server (router) in accordance with the principles of the present invention.

Referring now to FIG. 10, which is a block diagram of an exemplary wireless mesh cache server (router) in accordance with the principles of the present invention. The wireless mesh cache router (server) includes a cache, a streaming service module, a P2P service module, and one or more wireless communication (radio) interfaces. One wireless communication (radio) interface provides network access for client devices. Other radio interfaces form a mesh network with other mesh servers, MAPs or routers. Video content can be cached in the cache unit. The streaming service module receives the request from the clients and streams the video (data, content) to the clients. The P2P service module forms P2P networked system with other peers. The interfaces and modules of the mesh cache router (server) may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system.

A mesh cache router (server) apparatus includes means for receiving a request to select a mesh cache server and to establish a streaming route, means for determining if there is enough bandwidth to serve the request and quality of service requirements specified in the request can be met, means for broadcasting an enhanced route request message to locate the mesh cache server responsive to the determination, means for receiving at least one route reply message, means for selecting the mesh cache server and the streaming route responsive to the reply message, means for establishing the streaming route, means for transmitting a route confirmation message to the selected mesh cache server along the streaming route, means for transmitting a request granted message to originator of the request and means for transmitting a rejection responsive to the determination. The mesh cache router (server) apparatus also includes means for receiving a route request message to establish a streaming route, means for determining a cost of a reverse route and traffic load introduced by the requested streaming route, means for discarding the route request message if one of wireless interference constraints for the requested streaming route cannot be satisfied and quality of service requirements for the requested streaming route cannot be satisfied, means for pre-admitting the route request message if wireless interference constraints for the requested streaming route can be satisfied and if quality of service requirements for the requested streaming route can be satisfied, means for adding a routing table entry responsive to the pre-admission, means for admitting the requested streaming route, updating the routing table and transmitting a route reply message to an originator if requested content is cached, means for updating the route request message and forwarding the updated route request message if the requested content is not cached, means for receiving a route reply message and means for deleting the pre-admitted routing table entry if a time has expired. The mesh cache router (server) also includes means for determining the cost of the requested streaming route and a traffic load introduced by the requested streaming route, means for discarding the route reply message if one of wireless interference constraints for the requested streaming route cannot be satisfied and quality of service requirements for the requested streaming route cannot be satisfied, means for admitting the requested streaming route if wireless interference constraints for the requested streaming route can be satisfied and if quality of service requirements for the requested streaming route can be satisfied, means for updating the routing table entry to reserved, means for updating the route reply message and forwarding the updated route request message, means for receiving a route confirmation message and means for deleting the reserved routing table entry if a time has expired. The mesh cache router (server) apparatus also includes means for updating the routing table, means for updating the route confirmation message and forwarding the updated route confirmation message, means for receiving a data packet of the requested content, means for forwarding the data packet according to a corresponding entry in the routing table if a timer for the corresponding routing table entry has not expired, means for resetting the timer for the corresponding routing table entry and means for updating the corresponding routing table entry if the time has expired.

Figure 11:
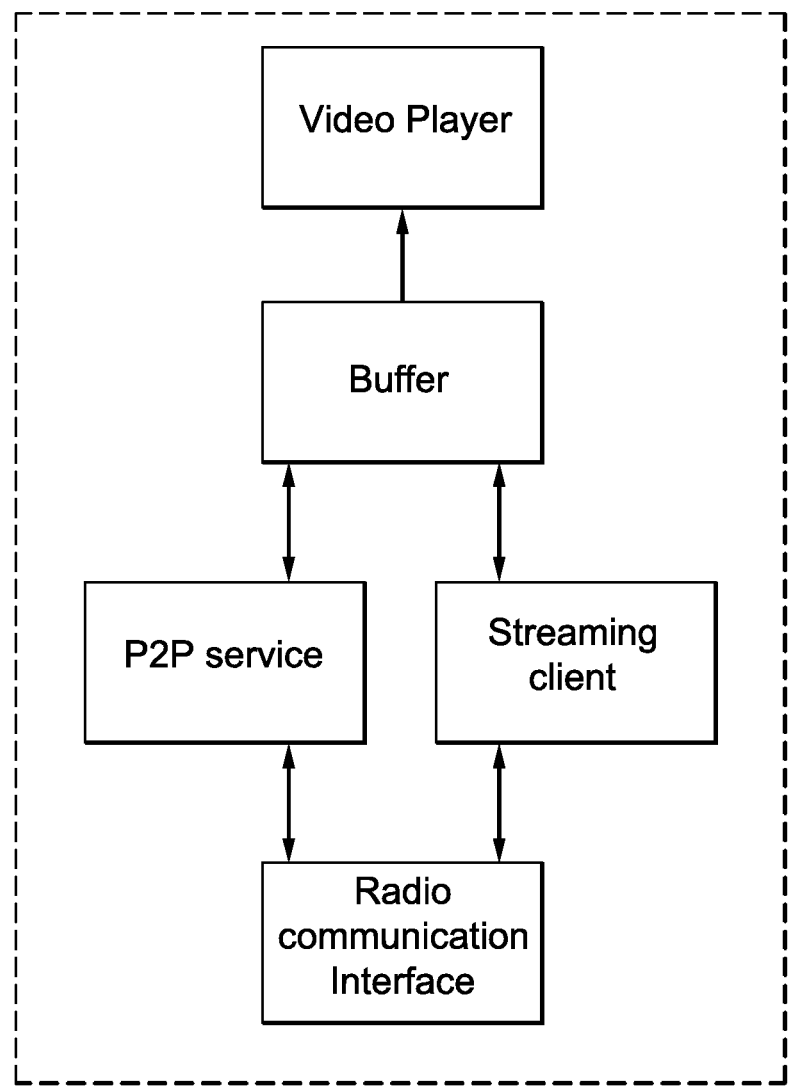
FIG. 11 is a block diagram of an exemplary wireless client device implementation of the present invention.

Referring now to FIG. 11, which is a block diagram of an exemplary wireless client device implementation of the present invention. An exemplary wireless client includes a P2P service module, a streaming client module, a buffer (cache), a player, and one or more wireless radio interfaces. The client associates with a MAP or mesh cache server or mesh cache router via its wireless radio interface. The P2P service module forms a P2P networked system with other peers to fetch (provide, download) data (video, content). The streaming client module requests and receives streamed data. The received data are stored in the buffer (cache). The data in the buffer is displayed by the player and may be fetched by other peers in the P2P system. The interfaces and modules of the mesh cache router (server) may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system.

A client apparatus (node, station) includes means for determining a number of clips to be streamed, means for requesting a selection of a mesh cache server to meet quality of service requirements for streaming the determined number of clips, means for establishing a streaming route responsive to the mesh cache server selection, means for receiving the number of streamed clips from the selected mesh cache server if the request is granted, means for joining a peer-to-peer network, means for downloading a next clip via the peer-to-peer network, means for requesting a selection of a mesh cache server to meet quality of service requirements for complimentary streaming any data missing from the next clip, means for receiving any data missing from the next clip via complimentary streaming if the request for complimentary streaming is granted and means for continuing to download any missing data of the next clip that has at least one of not passed its playback deadline and not been requested via complimentary streaming. The requesting means are made to one of a streaming controller and an associated mesh router. The means for determining if all data of the next clip has at least one of been received and the playback time has passed. The client apparatus also includes means for setting a clip identification for the next clip and means for determining if the clip identification for the next clip is less than a total number of clips. The client apparatus also includes means for continuing to download the next clip if a fetch deadline had not been exceeded. The client apparatus also includes means for updating the clip identification and setting the next clip to the updated clip identification if the download of the next clip has completed. The client apparatus also includes means for determining if any data is missing from the next clip. Quality of service requirements include data rate, delay and packet loss.

A central streaming server apparatus is implemented on a computing platform having hardware such as one or more central processing units (CPU), a random access memory (RAM), and input/output (I/O) interface(s). The computing platform also includes an operating system and microinstruction code. One or more routines including the collection of link characteristics and channel condition, cache server selection, and path (route) calculation and establishment as described in the present invention are executed on the central streaming server. It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
collecting link characteristics and channel conditions in a wireless mesh network;
receiving a request to select a mesh cache server to meet quality of service requirements for streaming a number of clips;
determining said mesh cache server and a streaming path;
transmitting a message to originator of said request including said selected mesh cache server and any intermediate mesh routers if said determination is feasible;
establishing said streaming route responsive to said request responsive to said transmission;
streaming said requested number of clips responsive to said establishment;
rejecting said request if said determination is not feasible.

2. A method, said method comprising:
receiving a request to select a mesh cache server and to establish a streaming route;
determining if there is enough bandwidth to serve said request and quality of service requirements specified in said request can be met;
broadcasting an enhanced route request message to locate said mesh cache server responsive to said determination;
receiving at least one route reply message;

selecting said mesh cache server and said streaming route responsive to said reply message;

establishing said streaming route;

transmitting a route confirmation message to said selected mesh cache server along said streaming route;

transmitting a request granted message to originator of said request; and transmitting a rejection responsive to said determination.

3. The method according to claim 2, wherein said route reply message includes route metrics.

4. A method, said method comprising:

receiving a route request message to establish a streaming route;

determining a cost of a reverse route and traffic load introduced by said requested streaming route;

discarding said route request message if one of wireless interference constraints for the requested streaming route cannot be satisfied and quality of service requirements for the requested streaming route cannot be satisfied;

pre-admitting said route request message if wireless interference constraints for the requested streaming route can be satisfied and if quality of service requirements for the requested streaming route can be satisfied;

adding a routing table entry responsive to said pre-admission;

admitting the requested streaming route, updating said routing table and transmitting a route reply message to an originator if requested content is cached;

updating said route request message and forwarding said updated route request message if said requested content is not cached;

receiving a route reply message; and deleting said pre-admitted routing table entry if a time has expired.

5. The method according to claim 4, wherein said first updating act updates said routing table entry to a reserved state.

6. The method according to claim 4, further comprising:

determining said cost of said requested streaming route and a traffic load introduced by said requested streaming route;

discarding said route reply message if one of wireless interference constraints for the requested streaming route cannot be satisfied and quality of service requirements for the requested streaming route cannot be satisfied;

admitting said requested streaming route if wireless interference constraints for the requested streaming route can be satisfied and if quality of service requirements for the requested streaming route can be satisfied;

updating said routing table entry to reserved;

updating said route reply message and forwarding said updated route request message;

receiving a route confirmation message; and deleting said reserved routing table entry if a time has expired.

7. The method according to claim 6, further comprising:

updating said routing table;

updating said route confirmation message and forwarding said updated route confirmation message;

receiving a data packet of said requested content;

forwarding said data packet according to a corresponding entry in said routing table if a timer for said corresponding routing table entry has not expired;

resetting said timer for said corresponding routing table entry; and updating said corresponding routing table entry if said time has expired.

8. The method according to claim 7, wherein said fifth updating act updates said routing table entry to an invalid state.

* * * * *